US009893676B2

(12) United States Patent
Anderson et al.

(10) Patent No.: US 9,893,676 B2
(45) Date of Patent: Feb. 13, 2018

(54) SOLAR PANEL MOUNTING SYSTEM WITH AERODYNAMIC BALLAST TRAYS

(71) Applicant: PanelClaw Group, Inc., North Andover, MA (US)

(72) Inventors: David Anderson, Wellesley, MA (US); Vasilije Jovanovic, Winchester, MA (US)

(73) Assignee: PANELCLAW GROUP, INC., North Andover, MA (US)

( * ) Notice: Subject to any disclaimer, the term of this patent is extended or adjusted under 35 U.S.C. 154(b) by 306 days.

(21) Appl. No.: 14/638,601

(22) Filed: Mar. 4, 2015

(65) Prior Publication Data
US 2015/0256120 A1 Sep. 10, 2015

Related U.S. Application Data

(60) Provisional application No. 61/948,216, filed on Mar. 5, 2014.

(51) Int. Cl.
E04D 13/18 (2014.01)
E04H 14/00 (2006.01)
(Continued)

(52) U.S. Cl.
CPC ............ *H02S 20/10* (2014.12); *F16M 11/06* (2013.01); *F24J 2/5239* (2013.01); *H02S 20/30* (2014.12);
(Continued)

(58) Field of Classification Search
CPC ......... H02S 20/10; H02S 20/30; F16M 11/06; F24J 2/5329; F24J 2002/5292; Y02E 10/47
(Continued)

(56) References Cited

U.S. PATENT DOCUMENTS 4,226,256 A 10/1980 Hawley
4,966,631 A 10/1990 Matlin et al.
(Continued)

FOREIGN PATENT DOCUMENTS

CN 103280473 9/2013
EP 0 344 523 B2 12/1989
(Continued)

OTHER PUBLICATIONS

B. Bienkiewicz and R.N. Meroney: "Wind Effects on Roof Ballast Pavers" Journal of Structural Division, American Society of Civil Engineering. Revised Sep. 1986 and again Jun. 1987 (34 pages).
(Continued)

Primary Examiner — Gwendolyn Baxter
(74) Attorney, Agent, or Firm — Foley & Lardner LLP

(57) ABSTRACT

Systems and methods for mounting one or more solar panels are disclosed. A tubular component can be provided. The tubular component can include a first curved portion configured to rise to a first height above and extending along a length of the tubular component. The first curved portion can have a predetermined diameter, a predetermined thickness, and a predetermined bend radius selected to support a first solar panel module attached by a first end at a first attachment point positioned at the first height. The first curved portion can include an elongated leg configured to support a deflector element projecting outwardly at a predetermined angle to the mounting surface. The tubular component also can include a distal end having a second curved portion configured to rise to a second height above and extending along the length of the tubular component. The distal end can have a second attachment point at the second height. The second attachment point can be separated from the first attachment point by a predetermined distance and can be
(Continued)

configured to support a second end of a second solar panel module at a predetermined tilt.

11 Claims, 18 Drawing Sheets

(51) Int. Cl.
| | |
|---|---|
| H02S 20/10 | (2014.01) |
| F16M 11/06 | (2006.01) |
| H02S 20/30 | (2014.01) |
| F24J 2/52 | (2006.01) |

(52) U.S. Cl.
CPC ........ *F24J 2002/5292* (2013.01); *Y02E 10/47* (2013.01)

(58) Field of Classification Search
USPC ............. 248/188.1; 52/90.2, 173.3; 126/623; 136/244, 251
See application file for complete search history.

(56) References Cited

U.S. PATENT DOCUMENTS

| | | | |
|---|---|---|---|
| 5,125,608 A | 6/1992 | McMaster et al. | |
| 5,143,556 A | 9/1992 | Matlin | |
| 5,228,924 A | 7/1993 | Barker et al. | |
| 8,276,330 B2* | 10/2012 | Harberts | F24J 2/5239 136/244 |
| 9,249,925 B2* | 2/2016 | Roensch | H01L 31/042 |
| 2010/0147359 A1 | 6/2010 | Harberts et al. | |
| 2011/0056536 A1* | 3/2011 | Meppelink | F24J 2/5237 136/244 |
| 2012/0048351 A1* | 3/2012 | Rizzo | F24J 2/5239 136/251 |
| 2013/0168339 A1 | 7/2013 | Anderson | |
| 2013/0192587 A1 | 8/2013 | Lewenz et al. | |
| 2014/0124018 A1* | 5/2014 | Goodman | H02S 20/30 136/251 |

FOREIGN PATENT DOCUMENTS

| | | |
|---|---|---|
| EP | 2 530 405 | 12/2012 |
| EP | 2 653 803 | 10/2013 |
| WO | WO-94/00650 | 1/1994 |
| WO | WO-2011/129686 | 10/2011 |

OTHER PUBLICATIONS

Bhaduri, S. and Murphy, L.M.: "Wind Loading on Solar Collectors" prepared for the U.S. Dept. of Energy for contract No. DE-ACO2-83CH10093, Golden, CO., Jun. 1985 (50 pages).
Chevalier, H.L. and Norton, D.J.: "Wind Loads on Solar Collector Panels and Support Structure" sponsored by the U.S. Dept. of Energy contract No. EV-76-S-05-5130, Oct. 1979 (98 pages).
Cochran, Leighton S., "Influence of Porosity on the Mean and Peak Wind Loads for Three Concentrator Photovoltaic Arrays" Colorado State University, Fort Collins, CO 1986 (14 pages).
Delmarva Power and Light Co.: Development of a Dispatchable PV Peak Shaving System; Prepared for the US Dept of Energy Cooperative Agreement No. DE-FC-93CHI0569. Oct. 1995 (77 pages).
Farrington, Robert and Kiss Cathcart Anders Architects, P.C.: Building Integrated Photovoltaics from the National Renewable Energy Laboratory for the U.S. Dept. of Energy under Contract No. DE-AC36-83CH10093, Jan. 1993 (64 pages).
Frantzis, Lisa, et al.:Building-Integrated Photovoltaics (BIPV) Analysis and US Market Potential for Building Equipment Div., US Dept of Energy Contract No. DE-AC01-90CE23821 Feb. 1995 (176 pages).
Fuentes, Martin: "Simplified Thermal Model for Flat-Plate Photovoltaic Arrays" Prepared by Sandia National Laboratories, Albuquerque, NM, May 1987 (60 pages).
Hersch, Paul; Strawn, Noni; Piekarski, Dick; Cook, Gary: "Photovoltaics for Residential Applications" Technical Information Branch, Solar Energy Research Institute, published Feb. 1984 (23 pages).
International Search Report and Written Opinion for PCT Appl. Ser. No. PCT/US2015/018811 dated May 21, 2015.
Kern, Dr. Edward C. Jr., Ascension Technology: "Low-Cost PV Array Mounting for Flat-roof Buildings" from the Third International Workshop on Photovoltaics in Buildings, Lincoln Center, MA (3 pages).
Kern, Edward C. Jr. and Russell, Miles C.: Array Designs for Flat-Roof Buildings; Retrieved from the Internet, 1993.
Kern, Edward C., Jr. and Russell, Miles C.: Rotating Shadow Band Pyranometer Irradiance Monitoring for Photovoltaic Generation Estimation from the 22nd IEEE Photovoltaic Specialists Conference—1991 vol. 1, Las Vegas, NV (7 pages).
Murphy, L.M.: "Wind Loading on Tracking and Field Mounted Solar Collectors", prepared by Solar Energy Research Institute, Golden, CO. for the U.S. Dept. of Energy, Dec. 1980 (10 pages).
Peterka, J.A., Sinou, J.M., and Cermak, J.E.: "Mean Wind Forces on Parabolic-Trough Solar Collectors" prepared for Sandia National Laboratories under Contract No. 13-2412, May 1980 (121 pages).
PV Specifications retrieved from the internet by Greg Pearen, Mar. 23, 2001 (11 pages).
Radu, Adrian; Axinte, Elena; and Theohari, Christina: "Steady Wind Pressures on Solar Collectors on Flat-Roofed Buildings" Journal of Wind Engineering and Industrial Aerodynamics, 23 (1986) 249-258 Elevator Science Publishers B.B., Amsterdam (10 pages).
Russell, M.C.: Solar Photovoltaic Systems for Residences in the Northeast, Lexington, MA, 1980 (7 pages).
Russell, Miles C. and Kern, Edward C. Jr.: "Stand-Off Building Block Systems for Roof-Mounted Photovoltaic Arrays Sandia Contract" 58/8796. Retrieved through Wisconsin Tech Search. Jun. 1986 (212 pages).
Siemens Solar Electric Modules Installation Guide, 1990 (8 pages).
Stafford, Byron: "Design Considerations and Performance of Maspeth a-Si PV System" American Institute of Physics, 1994 (8 pages).
Stiebel Eltron GmbH & Co.: KG: "Mount for the installment of Solar Panels" retrieved from German Patent Office, published Aug. 26, 1982 (9 pages).
Technical Information Branch, Solar Energy Research Institute: "Photovoltaics for Residential Applications" operated for the U.S. Dept. of Energy by Midwest Research Institute, Golden, CO, Feb. 1984 (23 pages).
Tieleman, H.W. et al.: "An Investigation of Wind Loads on Solar Collectors" prepared for the U.S. Dept. of Commerce National Bureau of Standards for contract No. EO-A01-78-3605, Jan. 1980 (173 pages).
Toggweiler, Peter, et. al.: Development of a flat-roof integrated photovoltaic system (SOFREL) Zurich, Switzerland, Mar. 1994 (189 pages).

\* cited by examiner

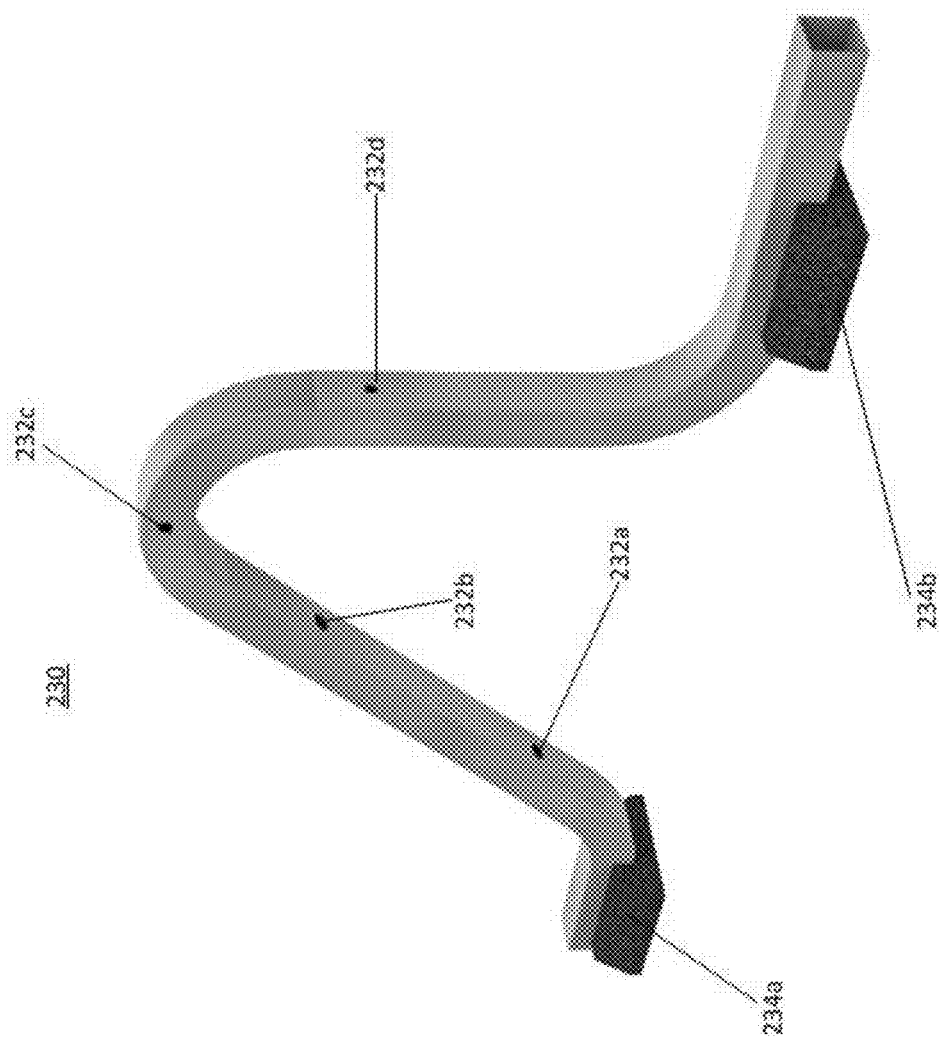

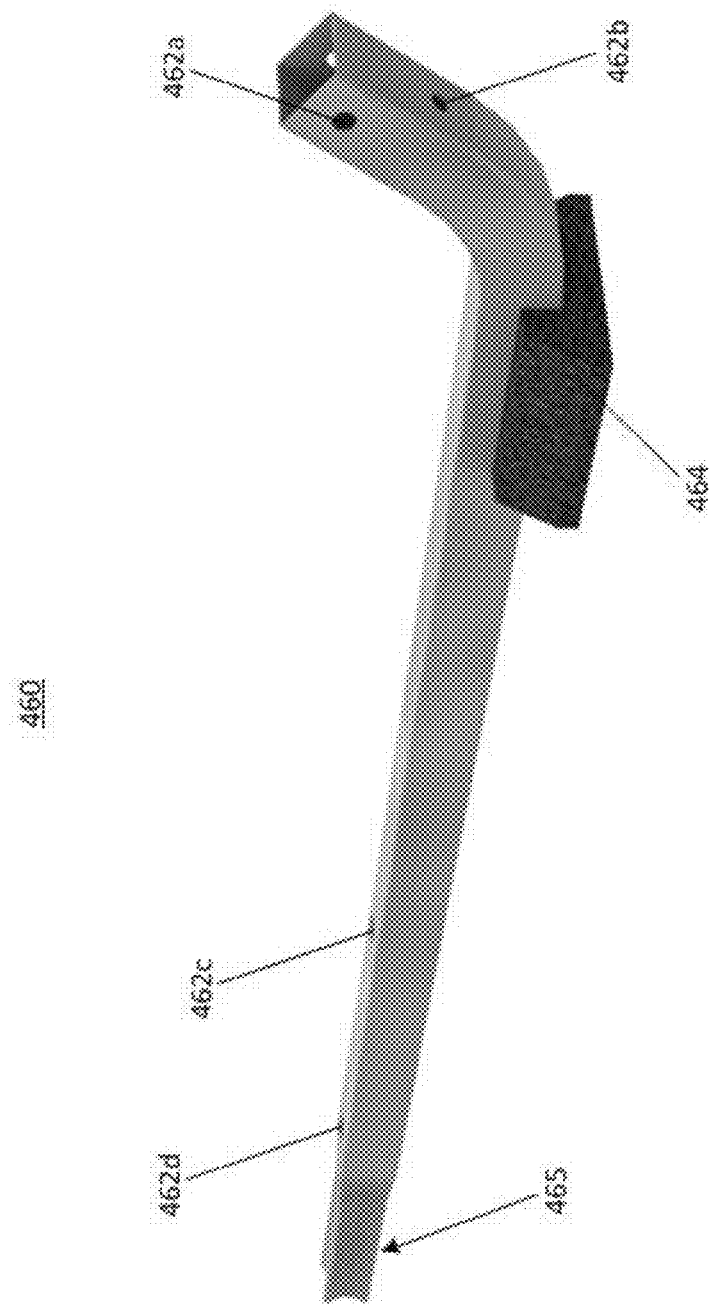

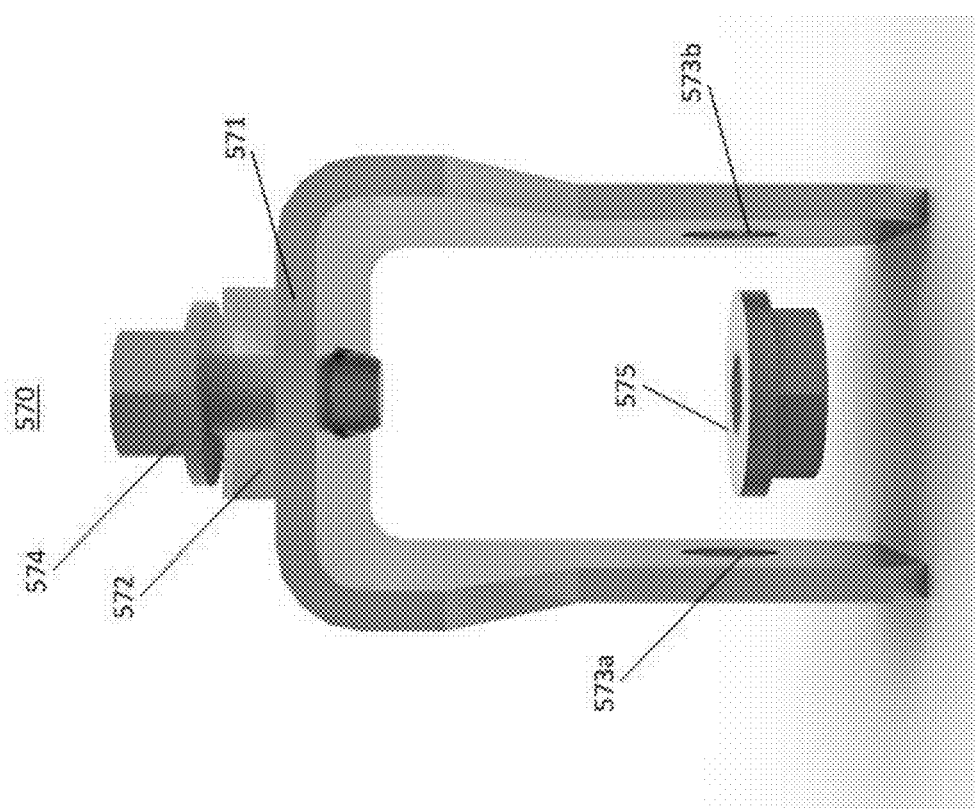

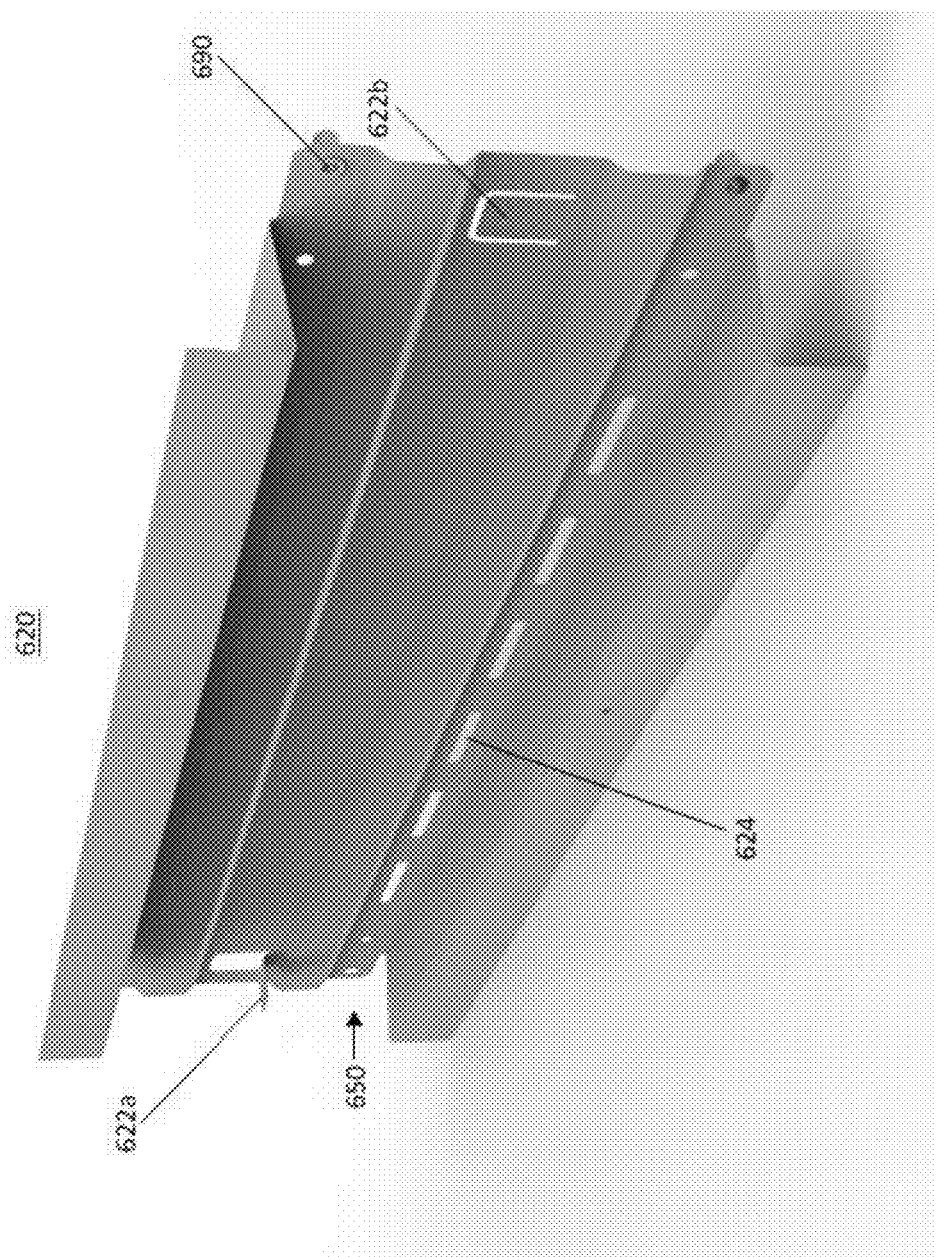

SOLAR PANEL MOUNTING SYSTEM WITH AERODYNAMIC BALLAST TRAYS

RELATED APPLICATIONS

The current application claims the benefit of and priority to U.S. Provisional Patent Application No. 61/948,216, filed Mar. 5, 2014, which is incorporated by reference in its entirety.

BACKGROUND

Solar (photovoltaic) panels are often manufactured in the form of flat rigid structures. To facilitate the performance of the function of generating electricity, solar panels may be mounted in an area exposed to the sun or other source of light. Often, solar panels are mounted outdoors at an angle from the horizontal so that they will more directly face the sun during peak daylight hours as opposed to panels mounted flat on the ground. In some applications, a number of solar panels are mounted together in an array in order to combine the power generation capabilities of the individual panels. In many instances, mounting systems for solar panel arrays can retain the solar panels in place. This may be accomplished by attaching the solar panels to one another in a mounting system and/or by mounting the panels to the mounting system.

SUMMARY OF THE DISCLOSURE

Aspects and implementations of the present disclosure are directed to systems and methods for mounting solar panels. A solar panel mounting system can include a plurality of support members formed from tubular structural components. The tubular components may be provided as straight components and bent into desired shapes. The shapes of the tubular components may be designed to reduce material cost and complexity relative to other systems for mounting solar panels. For example, the simplified component structure and manufacturing processes can reduce cost while providing sufficient structural strength to support a plurality of solar panels, wind ballast trays, and ballast blocks.

One innovative aspect of the subject matter described in this disclosure can be implemented in a tubular component to support to support one or more solar panel modules above a mounting surface. The tubular component can include a first curved portion configured to rise to a first height above and extending along a length of the tubular component. The first curved portion can have a predetermined diameter, a predetermined thickness, and a predetermined bend radius selected to support a first solar panel module attached by a first end at a first attachment point positioned at the first height. The first curved portion can include an elongated leg configured to support a deflector element projecting outwardly at a predetermined angle to the mounting surface. The tubular component also can include a distal end having a second curved portion configured to rise to a second height above and extending along the length of the tubular component. The distal end can have a second attachment point at the second height. The second attachment point can be separated from the first attachment point by a predetermined distance and can be configured to support a second end of a second solar panel module at a predetermined tilt.

In some implementations, the tubular component can be formed from an electrically conductive material configured to provide an electrical path from the one or more solar panel modules to earth ground. In some implementations, the electrically conductive material can include aluminum or steel.

In some implementations, at least a portion of the tubular component can have a cross-sectional shape that is square, circular, or hexagonal. In some implementations, the predetermined bend radius can be in the range of 1.5 inches to 2.5 inches. In some implementations, the predetermined diameter can be in the range of 0.5 inches to 1.5 inches.

In some implementations, the predetermined thickness can be about 0.035 inches. In some implementations, the predetermined angle of the deflector element can be in the range of 40 degrees to 50 degrees. In some implementations, the tubular component also can include at least one mounting hole formed through the elongated leg, the mounting hole configured to receive a fastener for securing the deflector element to the elongated leg.

Another innovative aspect of the subject matter described in this disclosure can be implemented in a deflector element for a solar panel module mounting system. The deflector element can include a tray, a first side wall coupled to a first edge of the tray and extending away from an upper surface of the tray, and a second side wall coupled to a second edge of the tray opposing the first edge of the tray. The second side wall can extend away from the upper surface of the tray, such that the tray, the first sidewall, and the second sidewall together define a channel for receiving a ballast weight. The first sidewall and the second sidewall can be arranged at angles of less than 90 degrees with the respect to the upper surface of the tray such that the first sidewall and the second sidewall exert a clamping force on the ballast weight when the ballast weight is positioned on the upper surface of the tray within the channel. The tray also can include a first security tab positioned at a first end of the tray and a second security tab positioned at a second end of the tray. The first security tab and the second security tab can be configured to be moved into positions protruding into the channel to prevent the ballast weight from sliding laterally within the channel.

In some implementations, the ballast weight can include one or more concrete blocks. In some implementations, the tray also can include at least one threaded fastener configured to secure the deflector element to an adjacent deflector element. In some implementations, the tray also can include a plurality of slots along the length of the tray. The plurality of slots can be configured to be aligned with at least one mounting hole of a solar panel module support structure to which the deflector element is secured.

Another innovative aspect of the subject matter described in this disclosure can be implemented in a system for mounting one or more solar panel modules above a supporting surface. The system can include at least one tubular component. The at least one tubular component can include a first curved portion configured to rise to a first height above and extending along a length of the tubular component. The first curved portion can have a predetermined diameter, a predetermined thickness, and a predetermined bend radius selected to support a first solar panel module attached by a first end at a first attachment point positioned at the first height. The first curved portion also can include an elongated leg configured to support a deflector element projecting outwardly at a predetermined angle to the mounting surface. The tubular component can include a distal end having a second curved portion configured to rise to a second height above and extending along the length of the tubular component and having a second attachment point at the second height. The second attachment point can be separated from the first attachment point by a predetermined distance and configured to support a second end of a second solar panel module at a predetermined tilt. The deflector element can include a tray, a first side wall coupled to a first edge of the tray and extending away from an upper surface of the tray, and a second side wall coupled to a second edge of the tray opposing the first edge of the tray. The second side wall can extend away from the upper surface of the tray, such that the tray, the first sidewall, and the second sidewall together define a channel for receiving a ballast weight. The first sidewall and the second sidewall can be arranged at angles of less than 90 degrees with the respect to the upper surface of the tray such that the first sidewall and the second sidewall exert a clamping force on the ballast weight when the ballast weight is positioned on the upper surface of the tray within the channel. The tray can include a first tab positioned at a first end of the tray and a second tab positioned at a second end of the tray. The first tab and the second tab can be configured to be moved into positions protruding into the channel to prevent the ballast weight from sliding laterally within the channel.

In some implementations, the system also can include a foot element positioned between a bottom surface of the at least one tubular component and the mounting surface to prevent damage to the mounting surface. In some implementations, the system can be configured to withstand winds of up to 150 miles per hour. In some implementations, the predetermined tilt of the second solar panel module can be opposed to the predetermined angle of the deflector element. In some implementations, the at least one tubular component can be formed from an electrically conductive material configured to provide an electrical path from the one or more solar panel modules to earth ground. In some implementations, the predetermined bend radius can be in the range of 1.5 inches to 2.5 inches. In some implementations, the predetermined angle of the deflector element can be in the range of 40 degrees to 50 degrees.

A system for mounting a solar panel above a supporting surface can include two rear support members in contact with the supporting surface. The system can include two front support members in contact with the mounting surface. The system can include a ballast tray extending between the two front support members and mounted on a front side of the front support members. The ballast tray can include a channel configured to support a ballast weight on an upper side of the ballast tray. Each of the rear support members and front support members can be formed from a tubular structure configured to bear the weight of a portion of the solar panel such that the solar panel is suspended above the supporting surface.

In some implementations, each of the tubular structures forming the front support member and the rear support members can have a thickness of about 0.035 inches. In some implementations, each of the tubular structures forming the front support member and the rear support members can have a diameter of about one inch. In some implementations, the tubular structures can be elongated members bent into a predefined shape so as to support the solar panel at a first predetermined angle and to support the ballast tray at a second predetermined angle.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIGS. 2A-2B are perspective views of a front support member used in the array of solar panels shown in FIG. 1A, according to an illustrative implementation.

FIGS. 4A-4D are perspective views of a rear support member used in the array of solar panels shown in FIG. 1B, according to an illustrative implementation.

FIGS. 5A-5B are various views of an attachment mechanism used in the array of solar panels shown in FIG. 1A, according to an illustrative implementation.

FIGS. 6A-6B are perspective views of a ballast tray used in the array of solar panels shown in FIG. 1A, according to an illustrative implementation.

DETAILED DESCRIPTION

Following below are more detailed descriptions of various concepts related to, and implementations of, solar panel mounting systems with aerodynamic ballast trays. The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
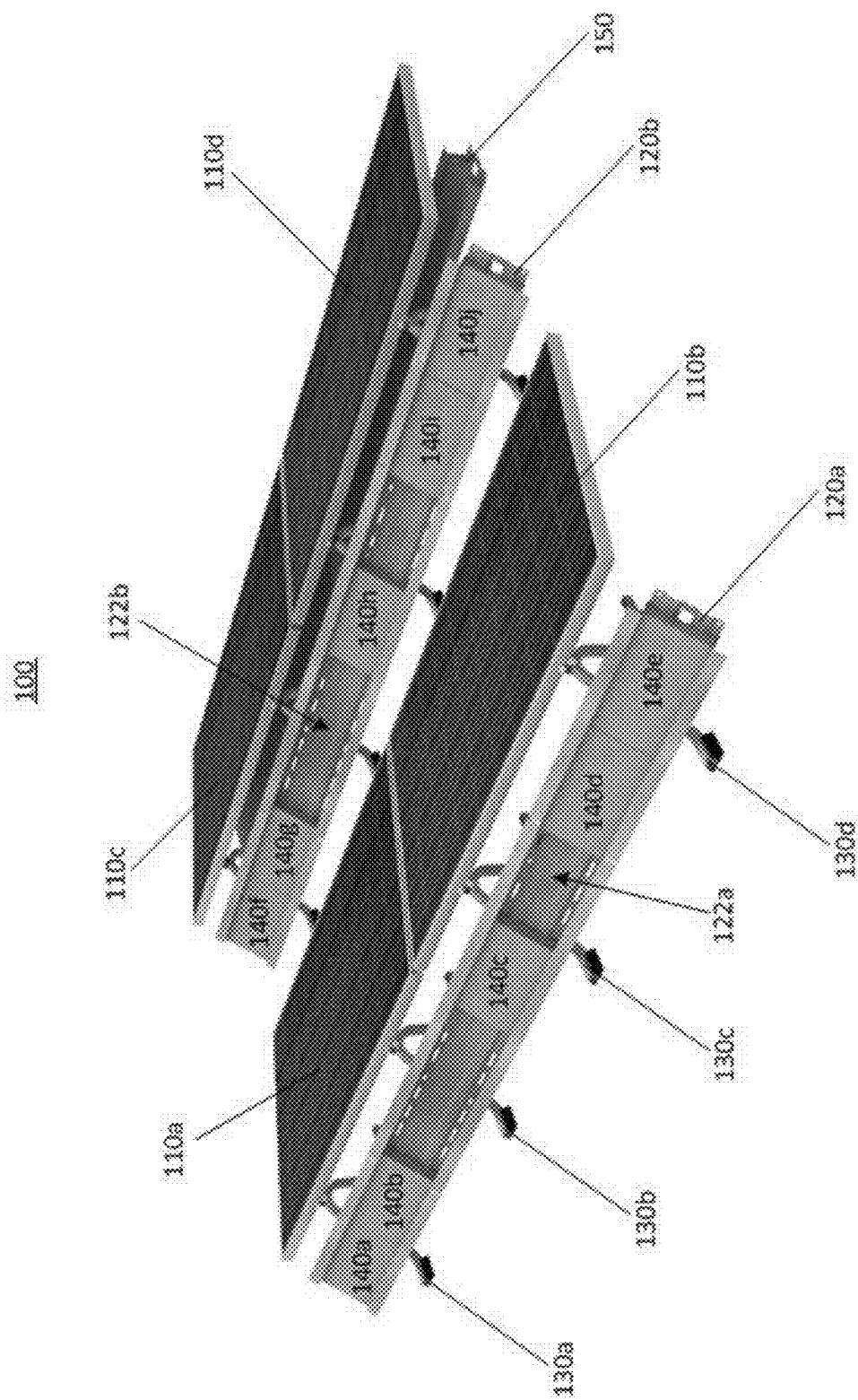
FIGS. 1A-1D are various views of an array of solar panels, according to an illustrative implementation.
Figure 1B:
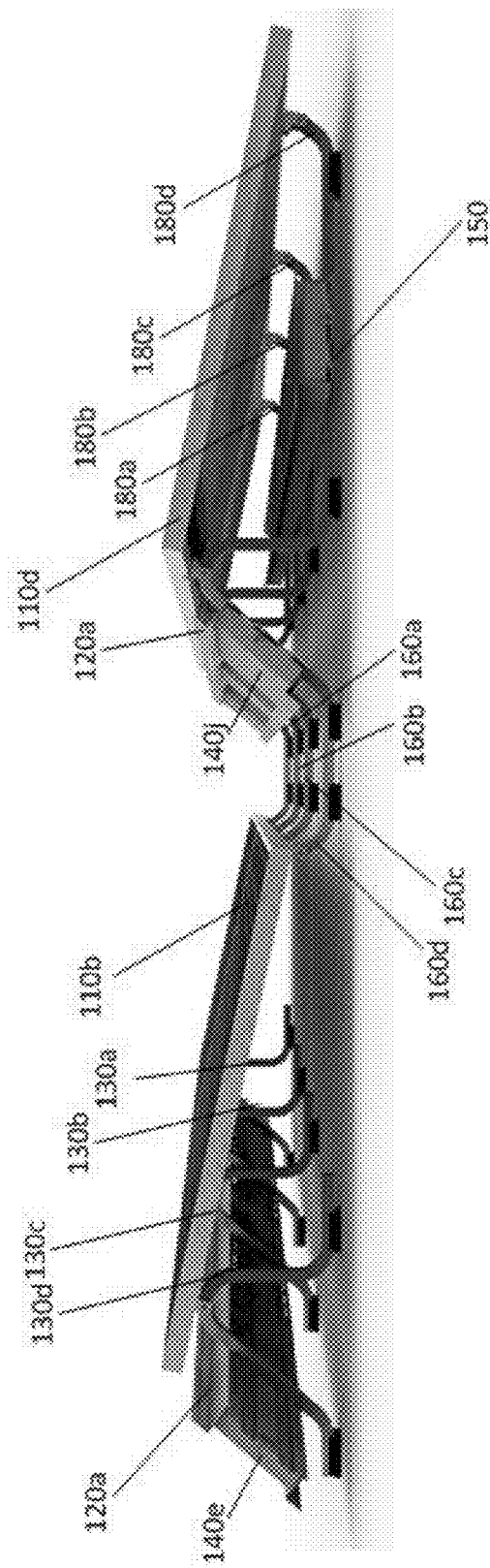
Figure 1C:
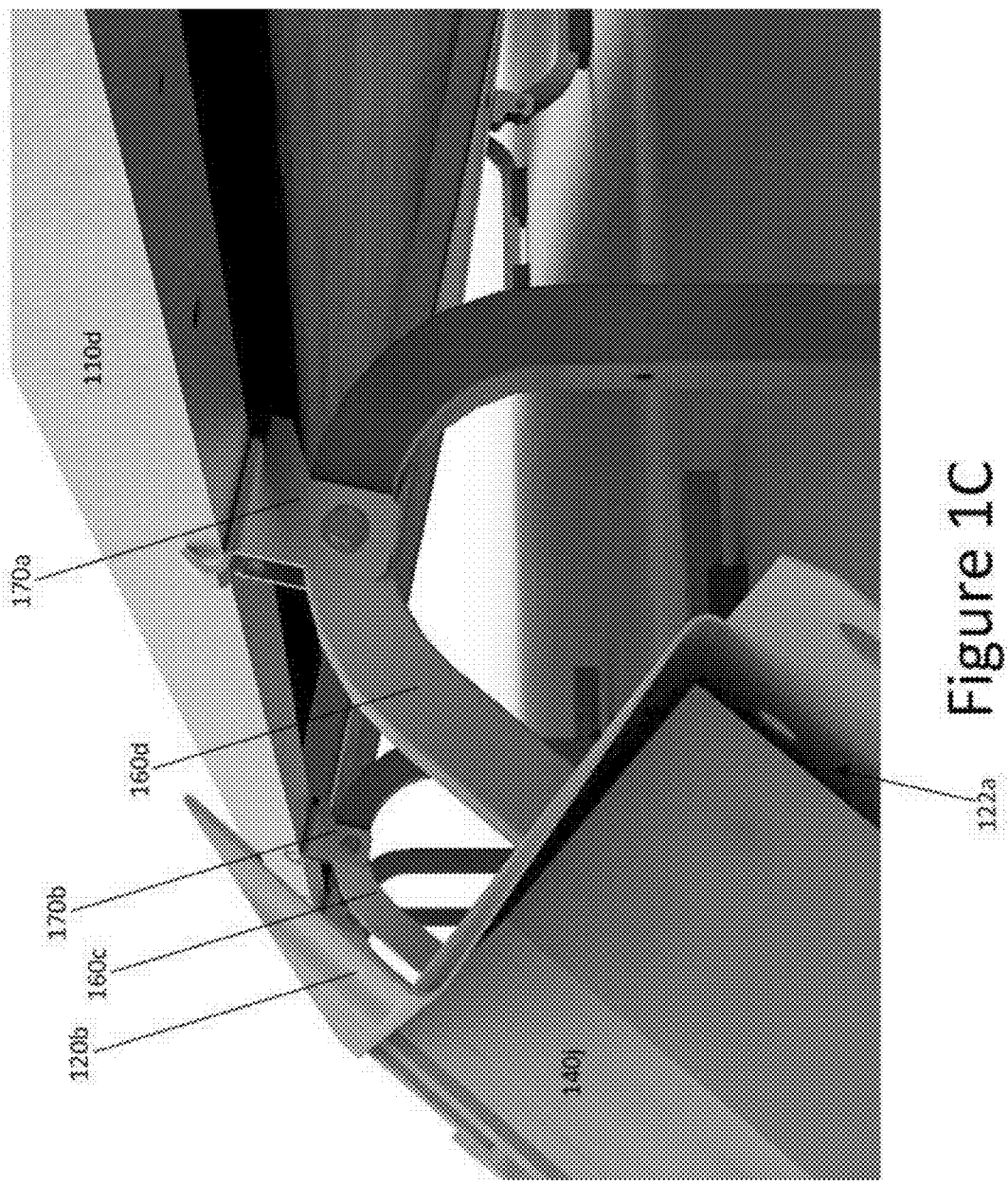
Figure 1D:
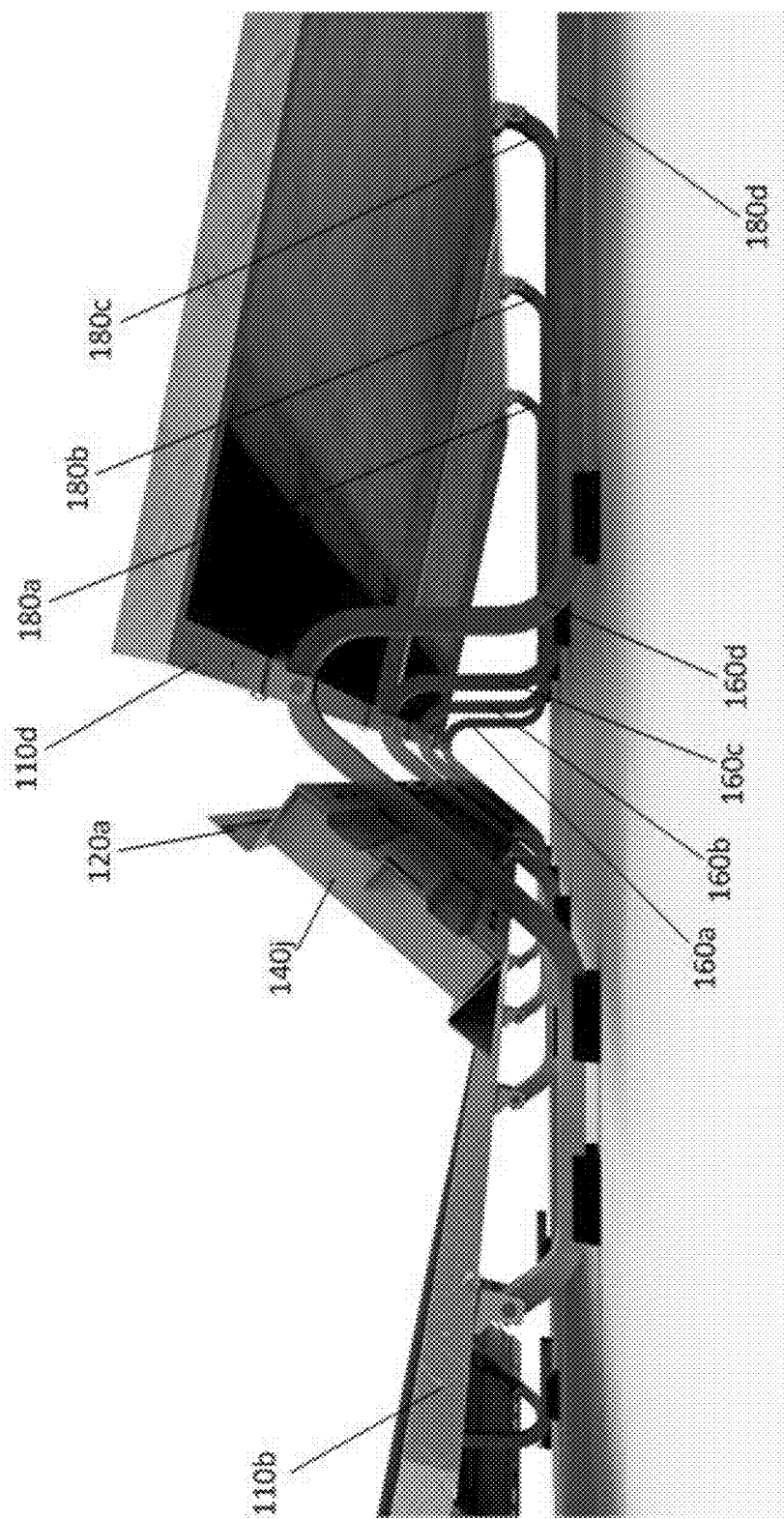

FIGS. 1A-1C are various views of an array 100 of solar panels, according to an illustrative implementation. The array 100 is configured to be mounted on a substantially flat mounting surface, such as a roof. The array 100 includes four solar panels 110a-110d (generally referred to as solar panels 110). In various other implementations, the array 100 may include any number of solar panels 110. The solar panels 110 are illustrated in FIG. 1 as being mounted at an angle from the horizontal (i.e., an angle from the plane of the mounting surface), but in some embodiments, the solar panels 110 may be mounted at angles other than that illustrated in FIG. 1, or they may be mounted horizontally. The solar panels 110 may, in some implementations, be mounted at different angles throughout the array 100 and uniformly in others such as the one shown in FIG. 1. The array 100 also includes two ballast trays 120a and 120b (generally referred to as ballast trays 120). These ballast trays 120 are located in FIG. 1 facing what will be described herein as the front side of array 100. What is described as the front side may correspond to a geographical North position of the array 100. As shown here, the front side may be positioned approximately to the North so that the tilted faces of the solar panels 110 are directed generally toward the South, e.g., tilted to more squarely face the direction of the sun for an installation north of the equator.

In some embodiments, each row of solar panels 110 may have a corresponding ballast tray 120, but in some embodiments, at least one of the rows of solar panels 110 in an array 100 may not have an accompanying ballast tray 120. For example, in one embodiment, ballast trays are positioned only on solar panels 110 in the front-most row of the array 100. In some embodiments, additional ballast trays may be mounted facing the lateral sides (e.g., the sides perpendicular to the front side) at the edges of the array, roughly perpendicular to the ballast trays 120 illustrated in FIG. 1. In another embodiment, ballast trays 120 are positioned only on the front and side edges of the array 100. The ballast trays 120 are oriented at an angle opposed to the angle of the solar panels 110. In some implementations, the ballast trays 120 are positioned so as to direct wind approaching the array 100 from the front side of the array 100 up and over the solar panels 110. Wind that is permitted to pass underneath the solar panels 110 can create lift forces that tend to displace the array 100 from its position on the mounting surface. The ballast trays 120 can block at least a portion of such wind, thereby increasing the stability of the array 100. In some implementations, wind impacting the ballast trays 120 from the front side of the array 100 can create downward forces on the array 100. The downward forces created by the ballast trays 120 can further increase the stability with which the array 100 is mounted to the mounting surface.

The ballast trays 120 and solar panels 110 in this example are mounted on front support members 130a-130d (generally referred to as front support members 130). As discussed above, the front of the array 100 may, in some implementations, correspond to a geographical north position. Thus, the front support members 130 may also be referred to as north support members 130. For simplicity, the these elements are primarily referred to as front support members 130 in throughout this disclosure. The front support members 130 are structural supports that may be used to support at least a portion of a solar panel 110. In this implementation, the front support members 130 rest on the mounting surface. The solar panels 110 and ballast trays 120 are secured to the front support members 130. The front support members 130 are described further below.

As shown in FIG. 1B, ballast trays 120 and solar panels 110 of the array 100 are also supported by middle support members 160a-160d (generally referred to as middle support members 160). The middle support members 160 are structural supports that may be used to support at least a portion of a solar panel 110. In this implementation, the middle support members 160 rest on the mounting surface. The solar panels 110 and ballast trays 120 are secured to the middle support members 160.

The ballast trays 120 each include a channel 122a and 122b, respectively (generally referred to as channels 122). The channels 122 are configured to receive one or more ballast blocks such as the ballast blocks 140a-140j (generally referred to as ballast blocks 140). The ballast blocks 140 provide the support members 130 with additional mass that may assist in keeping the array 100 securely in place on the mounting surface. Ballast blocks 140 may in some implementations be made from a concrete mix. Ballast blocks 140 in some implementations may be made from any concrete mix that is intended to withstand the elements for an appropriate period of time, such as cement intended for outdoor applications and having an intended life span of greater than 30 years. Ballast blocks 140 may in some embodiments be made using a Portland Type III concrete with maximum water absorption of about 10%. This concrete is a high early strength, normal weight concrete with a fully cured strength of at least 2,500 psi, and is available from Precast Specialties Inc. of Abington, Mass. In some implementations, ballast blocks 140 may be formed from materials such as, for example, metal, natural or recycled rubber, or Quazite®, a polymer concrete available from Hubbell Lenoir City, Inc. of Lenoir City, Tenn., or other materials. An additional ballast tray 150 is placed beneath the solar panels 110c and 110d. The ballast tray 150 can be configured to receive one or more ballast blocks 140 to add additional weight to the array 100.

Also shown in FIG. 1B are rear support members 180a-180d (generally referred to as rear support members 180). As discussed above, the rear of the array 100 may, in some implementations, correspond to a geographical south position. Thus, the rear support members 180 may also be referred to as south support members 180. For simplicity, the these elements are primarily referred to as rear support members 180 in throughout this disclosure. The rear support members 180 are structural supports that may be used to support at least a portion of a solar panel 110. In this implementation, the rear support members 1380 rest on the mounting surface. The solar panels 110 are secured to the rear support members 180. The rear support members 180 are described further below.

As shown in FIG. 1C, the channels 122 of the ballast trays 120 are configured to hold the ballast blocks 140 securely in place. For example, the side walls of the channels 122 are angled relative to the sides of the ballast blocks 140. Therefore, the side walls of the channels 122 function as clamps that exert of a force on the ballast blocks 140 when the ballast blocks 140 are positioned within the channels 122. This force helps to secure the ballast blocks 140 within the channels 140, so that the ballast blocks 140 cannot easily fall out of or otherwise be removed from the channels 122. Also shown in FIG. 1C are attachment mechanisms 170a and 170b (generally referred to as attachment mechanisms 170). The attachment mechanisms 170 secure the solar panel 110d to the middle support members 160d and 160c, respectively. A similar attachment mechanism is used to secure every other middle support member 160, front support member 130, and rear support member 180 to the respective solar panels 110. In this implementation, each solar panel 110 is fastened to four of the various support members by four respective attachment mechanisms 170.

Figure 2B:
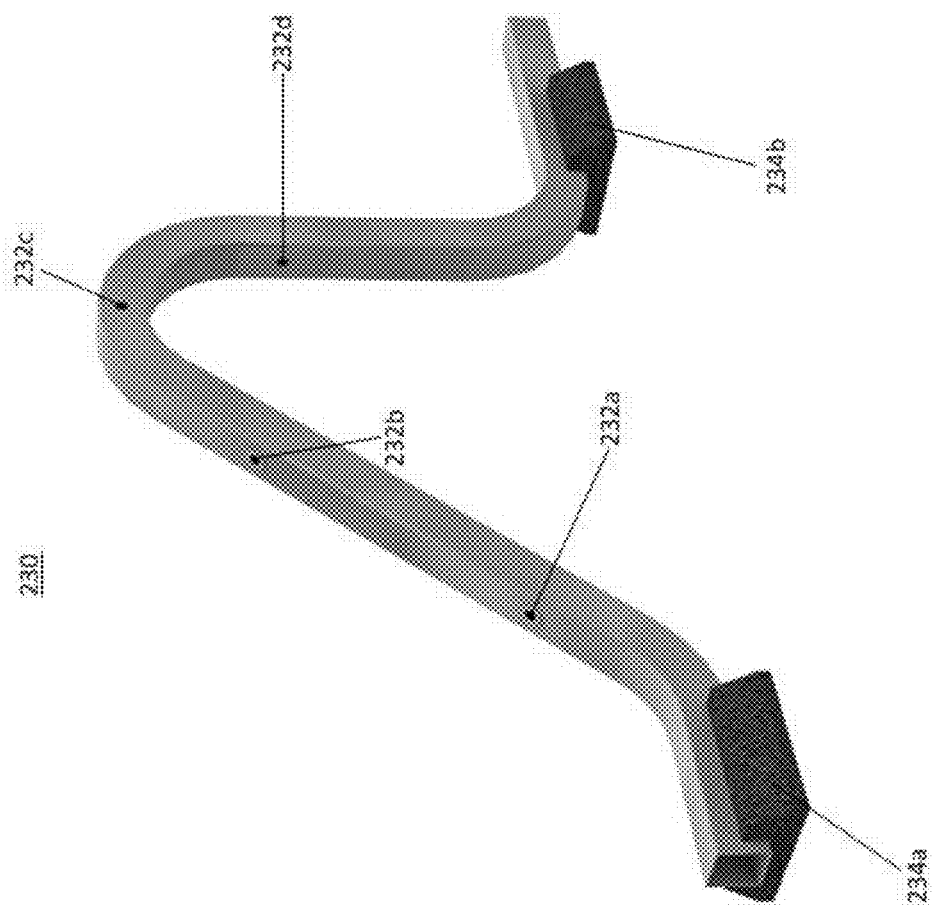

FIGS. 2A-2B are perspective views of a front support member 230 used in the array of solar panels shown in FIG. 1A, according to an illustrative implementation. The front support member 230 corresponds to the front support member 130 shown in FIGS. 1A-1C. The front support member 230 can be formed as a tubular component. In some implementations, the front support member 230 is formed from metal. For example, steel or aluminum may be used to form the front support member 230. In other implementations, a metal alloy may be used. Metal may be a suitable material due to its ability to provide structural integrity to the frame. In addition, metal conducts electricity well, which can allow for an electrical path to earth ground through the front support member 230. In other implementations, the front support member 230 can be formed from any material with sufficient structural rigidity to support the array of solar panels, regardless of electrical conductivity. For example, the structural supports may be formed from plastic or rubber.

In some implementations, the front support member 230 is hollow and has a square cross-sectional shape to increase structural efficiency. In other implementations, the front support member 230 may be solid or partially solid, and may have different cross sectional shapes. For example, the front support member 230 may have a circular, hexagonal, or I-beam cross sectional shape. As shown, the front support member 230 can be formed from a single tubular structure. This can promote ease of manufacturing and reduce the overall cost of the array of solar panels. For example, the front support member 230 can be formed into a straight tubular component and can then be bent into a predetermined or desired shape. In some implementations, the radius of curvature of the bent portions of the front support member 230 can be approximately two inches. In some other implementations, the front support member 230 may be formed from a plurality of structural members. For example, several structural members can be fused together in the shape of the front support member 230.

The front support member 230 includes four mounting holes 232a-232d (generally referred to as mounting holes 230). Each of the mounting holes 230 is drilled through the entire front support member 230. In some implementations, the mounting holes 230 can be used to fasten other components to the front support member 230. For example, the mounting holes 232a and 232b can be used to secure a ballast tray, such as the ballast tray 120a shown in FIG. 1A, to the front support member 230. Similarly, the mounting hole 232c can be used together with an attachment mechanism to fasten a solar panel such as the solar panels 110 shown in FIG. 1A to the front support member 230. In some implementations, one or more of the mounting holes 232, such as the mounting hole 232d, can be used for fasting a grounding device to the front support member 230.

A portion of the front support member 230 extends substantially along the mounting surface for stability. In some implementations, the front support member 230 can include feet 234a and 234b (generally referred to as feet 234) placed between the bottom of the front support member 230 and the mounting surface. In some implementations, a foot 234 may be made from any material that can be considered an "inert pad" by the roofing industry. In some implementations, feet 234 may be made from recycled, non-vulcanized crumb rubber, such as that available from Unity Creations Ltd. of Hicksville, N.Y. In other implementations feet 234 may be made from natural rubber, EPDM (Ethylene Propylene Diene Monomer—a rubber roofing material), or another roofing material that may protect the roof or other surface upon which array 100 may be mounted from damage by the material of front support member 230. Feet 234 may be secured to the front support member 230 using a plastic fastener, such as a push-in, ribbed shank plastic rivet. In some implmenetations, an adhesive, such as, for example, epoxy (e.g., ChemRex 948) can be used.

Figure 3A:
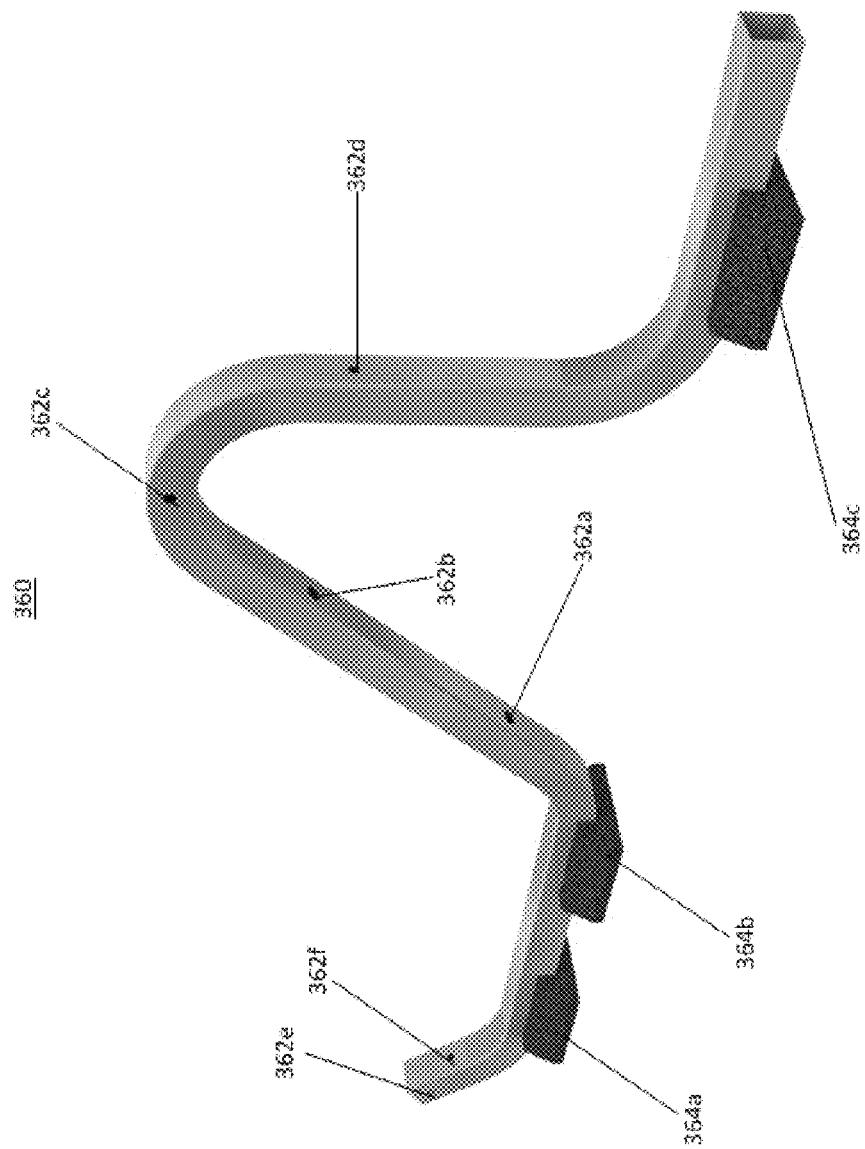
FIGS. 3A-3B are perspective views of a middle support member used in the array of solar panels shown in FIG. 1A, according to an illustrative implementation.
Figure 3B:
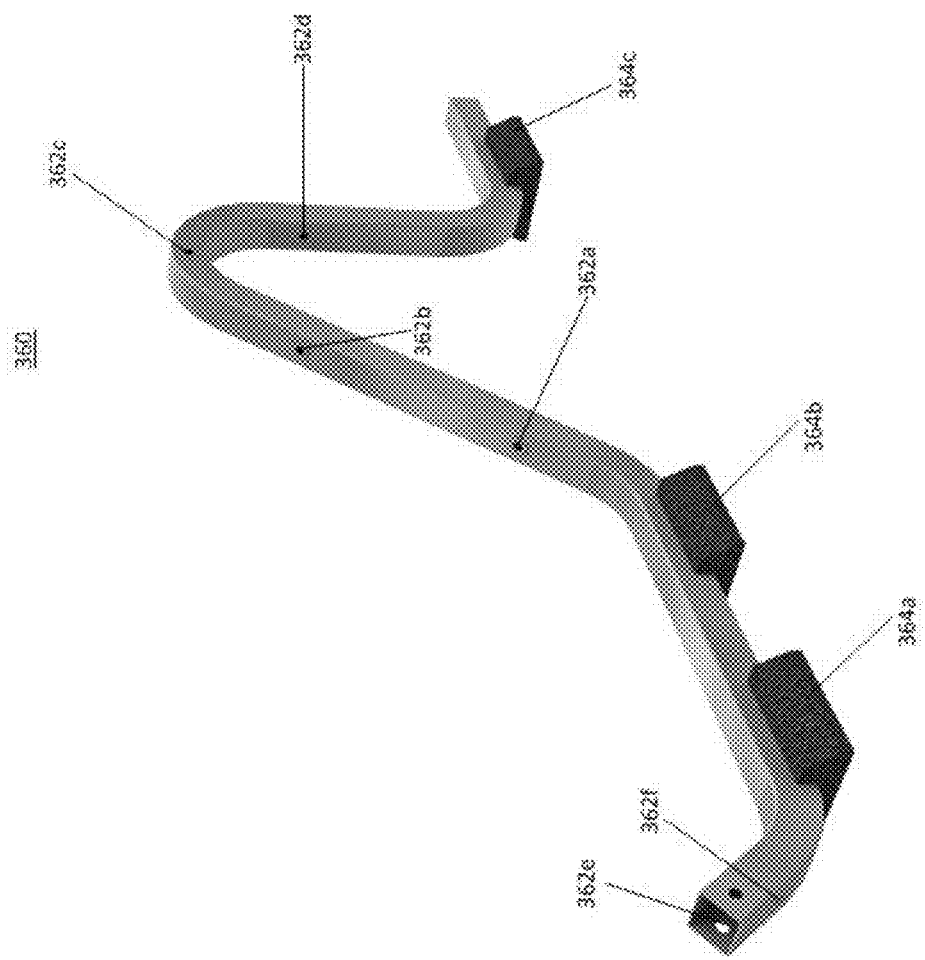
Figure 4A:
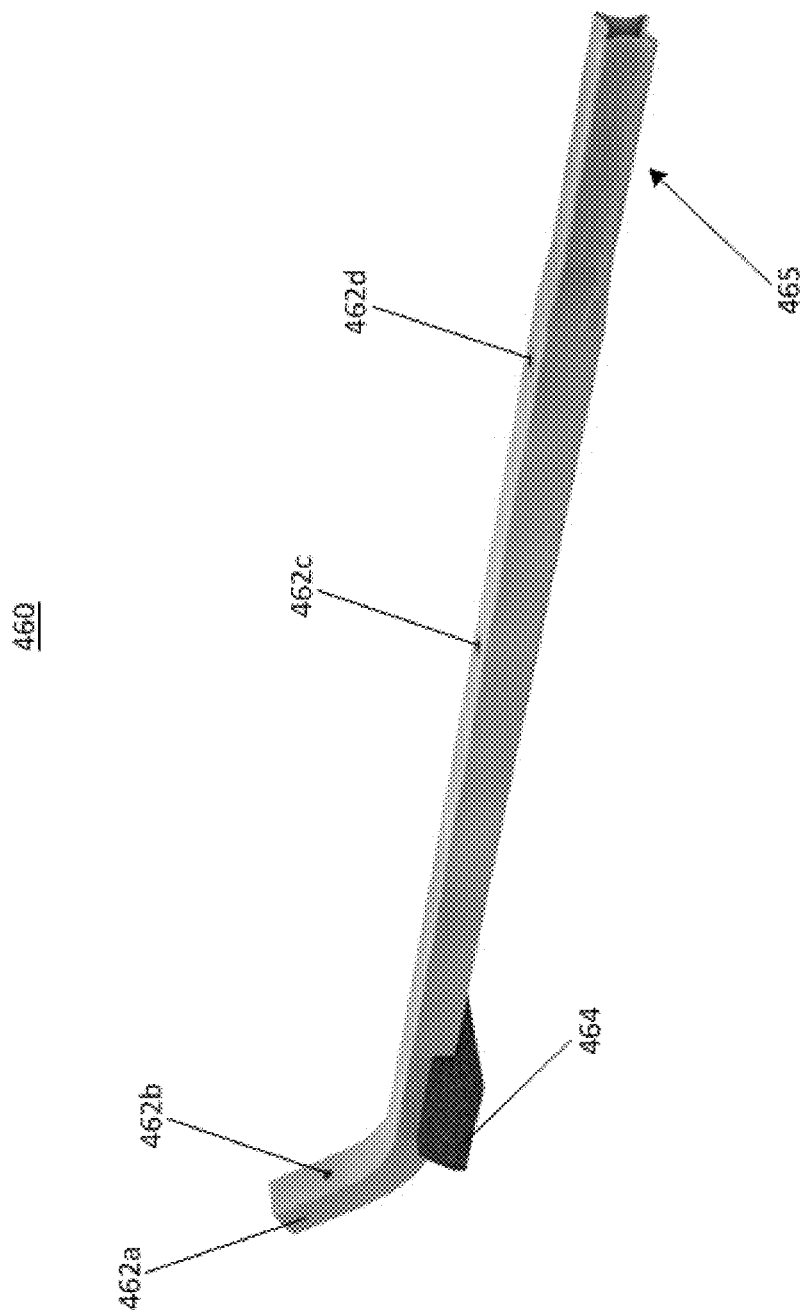
Figure 4B:
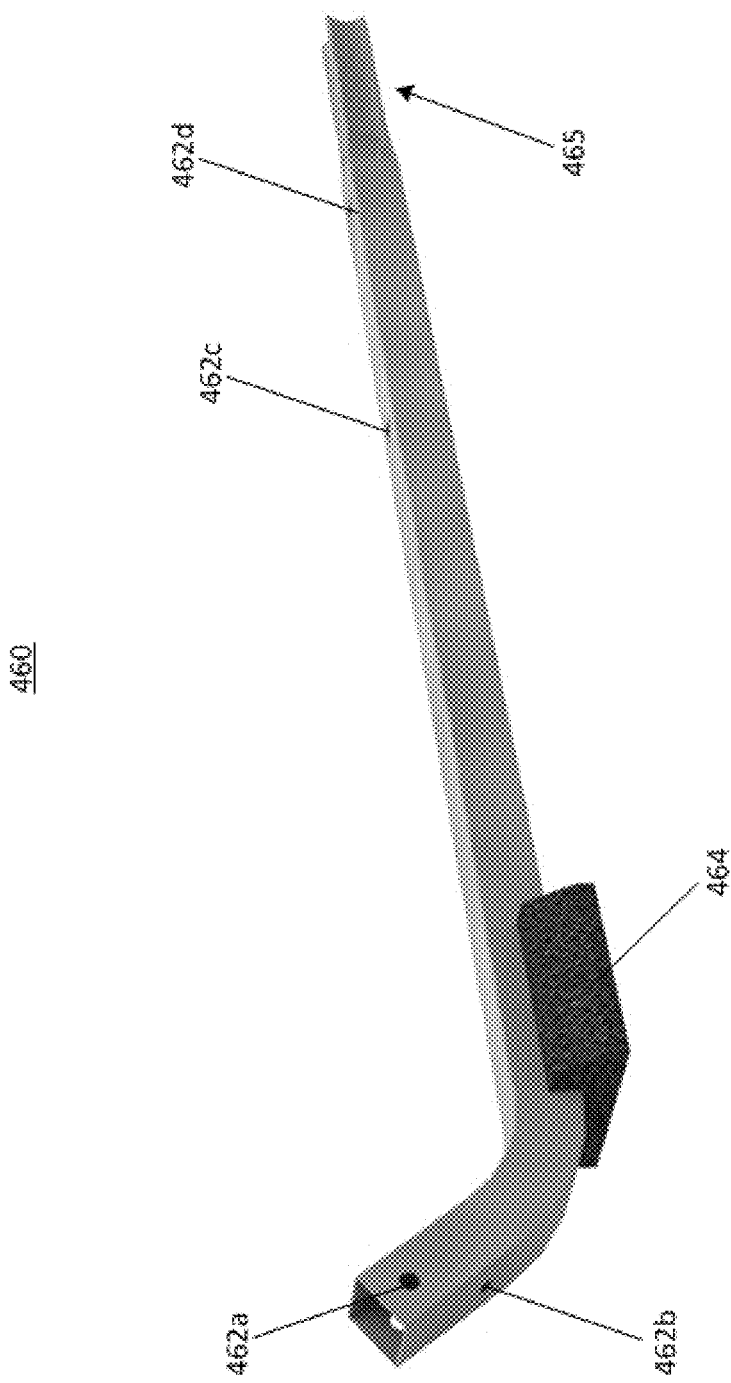
Figure 4D:
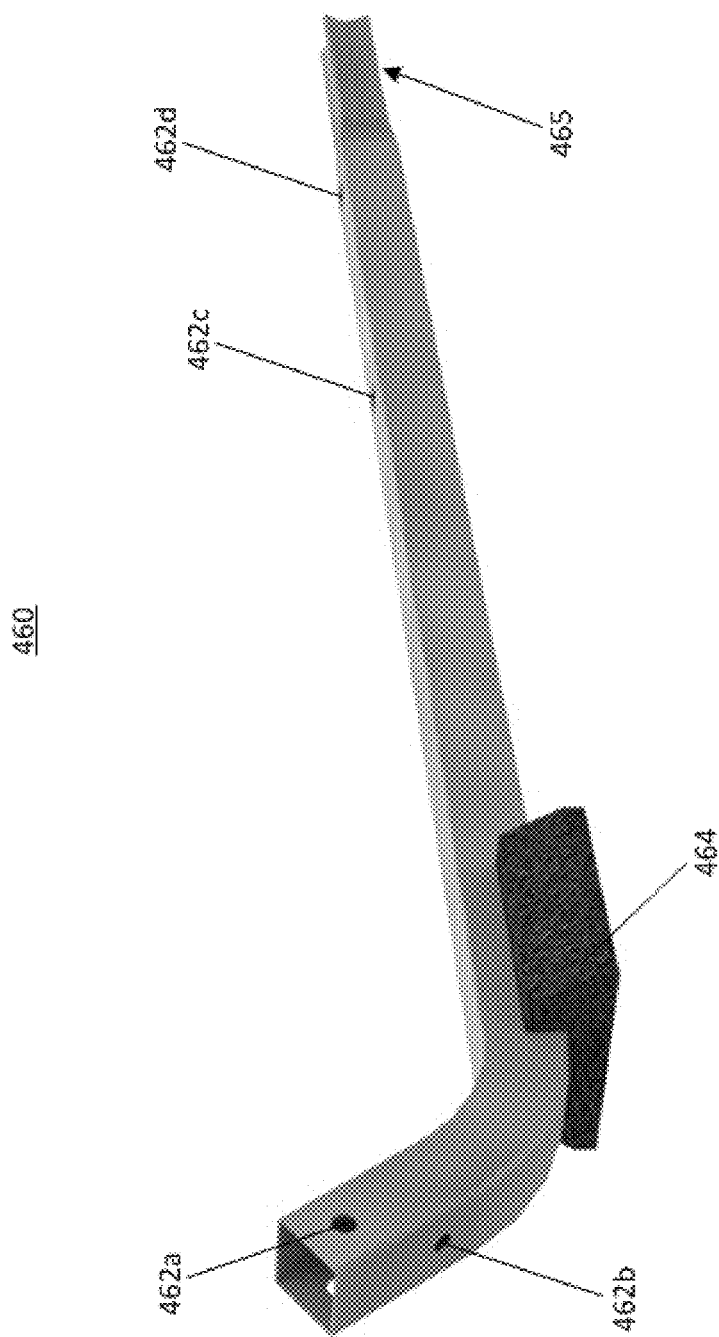

FIGS. 3A-3B are perspective views of a middle support member 360 used in the array of solar panels shown in FIG. 1A, according to an illustrative implementation. The middle support member 360 corresponds to the middle support member 160 shown in FIGS. 1A-1C. The middle support member 360 can be formed as a tubular component. In some implementations, the middle support member 360 is formed from metal. For example, steel or aluminum may be used to form the front support member 230. In other implementations, a metal alloy may be used. Metal may be a suitable material due to its ability to provide structural integrity to the frame. In addition, metal conducts electricity well, which can allow for an electrical path to earth ground through the middle support member 360. In other implementations, the middle support member 360 can be formed from any material with sufficient structural rigidity to support the array of solar panels, regardless of electrical conductivity. For example, the structural supports may be formed from plastic or rubber.

In some implementations, the middle support member 360 is hollow and has a square cross-sectional shape to increase structural efficiency. In other implementations, the middle support member 360 may be solid or partially solid, and may have different cross sectional shapes. For example, middle support member 360 may have a circular, hexagonal, or I-beam cross sectional shape. As shown, the middle support member 360 can be formed from a single tubular structure. This can promote ease of manufacturing and reduce the overall cost of the array of solar panels. For example, the middle support member 360 can be formed into a straight tubular component and can then be bent into its proper shape. In some implementations, the radius of curvature of the bent portions of the middle support member 360 can be approximately two inches. In some other implementations, the middle support member 360 may be formed from a plurality of structural members. For example, several structural members can be fused together in the shape of the middle support member 360.

The middle support member 360 may include six mounting holes 362a-362f (generally referred to as mounting holes 362). Each of the mounting holes 360 is drilled through the entire middle support member 360. In some implementations, the mounting holes 360 can be used to fasten other components to the middle support member 360. For example, the mounting holes 362a and 362b can be used to secure a ballast tray, such as the ballast tray 120b shown in FIG. 1A, to the middle support member 360. Similarly, the mounting hole 362c can be used together with an attachment mechanism to fasten a solar panel such as the solar panels 110 shown in FIG. 1A to the front support member 230. The portion of the support member 360 that includes the mounting hole 362c rises to a first height selected to support a front portion of a solar panel. The mounting hole 362e also can be used together with an attachment mechanism to fasten another solar panel such as the solar panels 110 shown in FIG. 1A to the middle support member 360. The mounting hole 362e is positioned on a distal end of the support member 360 which includes a curved portion rising to a second height. Thus, the middle support member 360 can support two separate solar panels; one fastened to via the mounting hole 362c and one fastened via the mounting hole 362e.

A portion of the middle support member 360 extends substantially along the mounting surface for stability. In some implementations, the middle support member 360 can include feet 364a and 364b (generally referred to as feet 364) placed between the bottom of the front support member 360 and the mounting surface. In some implementations, the feet 364 may be made from any material that can be considered an "inert pad" by the roofing industry, including any of the materials identified above in connection with the feet 234 shown in FIGS. 2A-2B.

FIGS. 4A-4D are perspective views of a rear support member used in the array of solar panels shown in FIG. 1B, according to an illustrative implementation. The rear support member 460 corresponds to the rear support member 180 shown in FIGS. 1B and 1D. The rear support member 460 can be formed as a tubular component. In some implementations, the front support member 460 is formed from metal. For example, steel or aluminum may be used to form the rear support member 460. In other implementations, a metal alloy may be used. Metal may be a suitable material due to its ability to provide structural integrity to the frame. In addition, metal conducts electricity well, which can allow for an electrical path to earth ground through the rear support member 460. In other implementations, the rear support member 460 can be formed from any material with sufficient structural rigidity to support the array of solar panels, regardless of electrical conductivity. For example, the rear support member 460 may be formed from plastic or rubber.

In some implementations, the rear support member 460 is hollow and has a square cross-sectional shape to increase structural efficiency. In other implementations, the rear support member 460 may be solid or partially solid, and may have different cross sectional shapes. For example, the rear support member 460 may have a circular, hexagonal, or I-beam cross sectional shape. As shown, the rear support member 460 can be formed from a single tubular structure. This can promote ease of manufacturing and reduce the overall cost of the array of solar panels. For example, the rear support member 460 can be formed into a straight tubular component and can then be bent into a predetermined or desired shape. In some implementations, the radius of curvature of the bent portions of the rear support member 460 can be approximately two inches. In some other implementations, the rear support member 460 may be formed from a plurality of structural members. For example, several structural members can be fused together in the shape of the rear support member 460.

The rear support member 460 includes four mounting holes 462a-462d (generally referred to as mounting holes 462.) Each of the mounting holes 460 is drilled through the entire rear support member 460. In some implementations, the mounting holes 460 can be used to fasten other components to the front support member 230. For example, the mounting holes 462c and 462d can be used to secure a ballast tray, such as the ballast tray 150 shown in FIG. 1B, to the rear support member 460. Similarly, the mounting holes 462a and 462b can be used together with an attachment mechanism to fasten a solar panel such as the solar panels 110 shown in FIG. 1A to the rear support member 460. In some implementations, one or more of the mounting holes 464 can be used for fasting a grounding device to the rear support member 460.

A portion of the rear support member 460 extends substantially along the mounting surface for stability. In some implementations, the rear support member 460 can include a foot 464 placed between the bottom of the rear support member 460 and the mounting surface. In some implementations, the foot 464 may be made from any material that can be considered an "inert pad" by the roofing industry. In some implementations, the foot 464 may be made from recycled, non-vulcanized crumb rubber, such as that available from Unity Creations Ltd. of Hicksville, N.Y. In other implementations the foot 464 may be made from natural rubber, EPDM (Ethylene Propylene Diene Monomer—a rubber roofing material), or another roofing material that may protect the roof or other surface upon which array 100 may be mounted from damage by the material of rear support member 460. The foot 464 may be secured to the rear support member 460 using a plastic fastener, such as a push-in, ribbed shank plastic rivet. In some implementations, an adhesive, such as, for example, epoxy (e.g., as ChemRex 948) can be used.

Also shown in FIGS. 4A-4D is a swaged section 465 of the rear support member 460. The swaged section can be formed to have a smaller cross-sectional shape than the other sections of the rear support member 460 as well as the front support member 230 shown in FIGS. 2A and 2B and the middle support member 360 shown in FIGS. 3A and 3B. In some implementations, the swaged section 465 of the rear support member 460 can be configured to be inserted into a portion of the middle support member 360. Such an arrangement is shown, for example, in FIG. 1D, in which the rear support member 180D is inserted into the middle support member 160d. Thus, the swaged section 465 of the rear support member 460 can "telescope" within a section of the middle support member to change the overall length of the support frame.

Figure 5A:
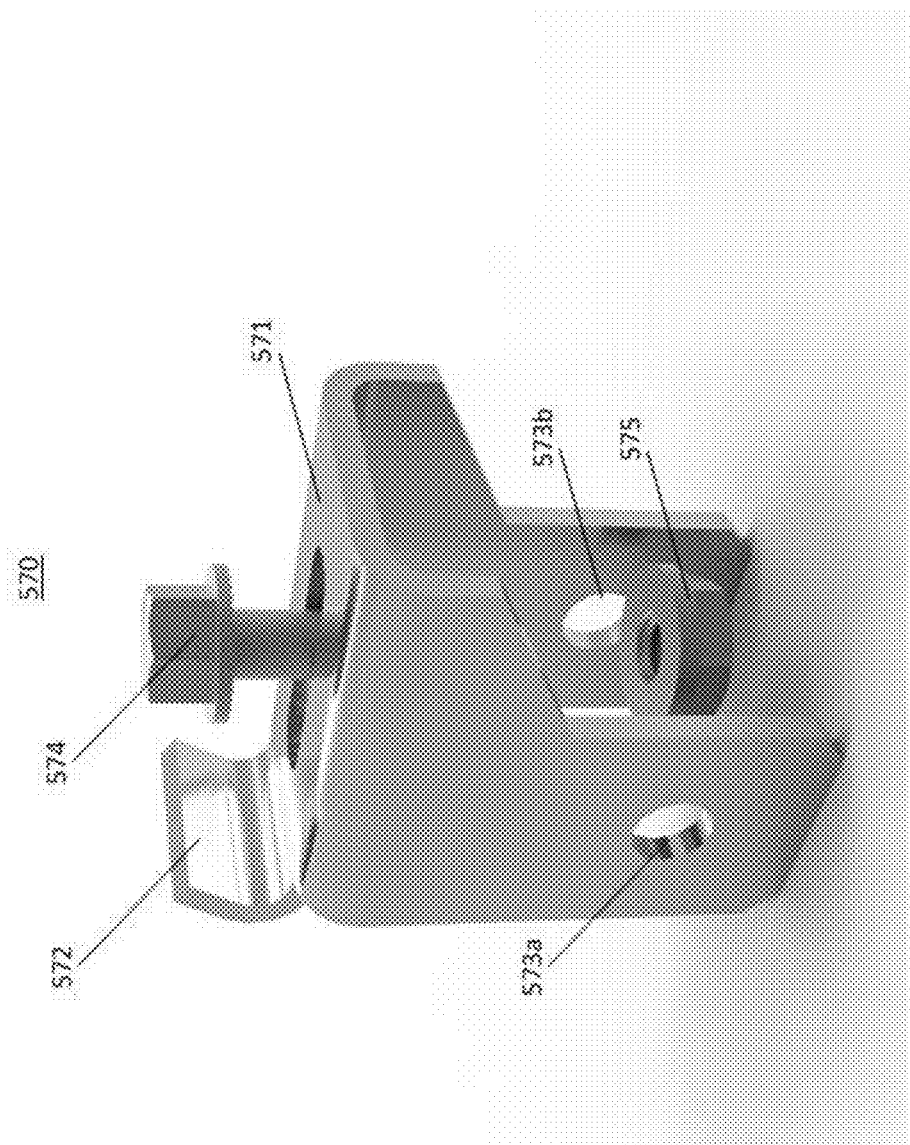

FIGS. 5A-5B are various views of an attachment mechanism 570 used in the array of solar panels shown in FIG. 1C, according to an illustrative implementation. The attachment mechanism 570 corresponds to the attachment mechanism 170 shown in FIG. 1A. The attachment mechanism 570 can be used to mount a solar panel to a front support member, such as the front support member 230 shown in FIGS. 2A-2B, a middle support member, such as the middle support member 360 shown in FIGS. 3A-3B, or a rear support member, such as the rear support member 460 shown in FIGS. 4A-4D. The attachment mechanism 570 includes a flat upper portion 571 coupled to a flange 572. Mounting holes 573a and 573b (generally referred to as mounting holes 573) are positioned along the sides of the attachment mechanism and arranged in a coaxial fashion with respect to one another. The attachment mechanism 570 also includes a bolt 574 and a nut 575.

The function of the attachment mechanism 570 is most readily understood with reference to FIG. 1C, which shows the attachment mechanism 170a securing solar panel 110d to middle support member 160d. Referring now to FIGS. 1C and 5A-5B, the attachment mechanism 570 can be fastened to a middle support member 160 by aligning the mounting holes 573 of the attachment mechanism 570 with mounting holes on the middle support member 160. A mechanical fastener, such as a bolt, nail, screw, or metal rivet can then be placed through the mounting holes to secure the attachment mechanism 570 to the middle support member 160. Next, an edge of the solar panel 110 can be placed in contact with the flat upper portion 571 of the attachment mechanism 570. The solar panel 110 can be positioned such that a mounting hole in the edge of the solar panel is aligned with the bolt 574. As shown in FIG. 5A, the bolt 574 fits through a slot in the attachment mechanism 570. In some implementations, the slot may be about 0.75 inches in length. The slot can allow the bolt 574 to be joined to a variety of solar panel modules which may have mounting holes positioned at slightly different locations. The bolt 574 can then be placed through the mounting hole in the solar panel 110 and can be secured with the nut 575. When secured in this fashion, the flange 572 also comes into contact with the solar panel 110 to provide additional support and to ensure that the attachment mechanism 570 remains securely aligned with the solar panel 110. The serrated portion of the bolt 574 also can break an annodization layer included in a solar panel module or in the solar panel module frame, thereby forming a conductive path to facilitate grounding. In some implementations, the flange 572 can also facilitate calculation of the power density of the solar panel array 100. For example, power density can be a function of solar panel width. Because the flange 572 contacts the solar panels 100 at their front and rear edges, the width of each solar panel is substantially equal to the distance separating the flanges 572 of attachment mechanisms 570 in adjacent rows of the array 100. Knowledge of this separation distance therefore provides knowledge of the width of each solar panel 110. As a result, the power density of the entire array can be calculated with relative ease.

In some implementations, the solar panels 110 may have mounting holes drilled in pre-selected locations along the edges of the solar panels 110. A technician can select an appropriate mounting hole for use with the attachment mechanism 570 at the installation site. In other implementations, the mounting hole may be formed through the edge of the solar panel at the installation site, as part of the installation process. It should be understood that the attachment mechanism 570 can also be used in a similar manner to attach a solar panel 110 to another point on a middle support member 160 (e.g., using the mounting hole 362e shown in FIGS. 3A-3B) or on a front support member 230 (e.g., using the mounting hole 232c shown in FIGS. 2B-2C).

Figure 6A:
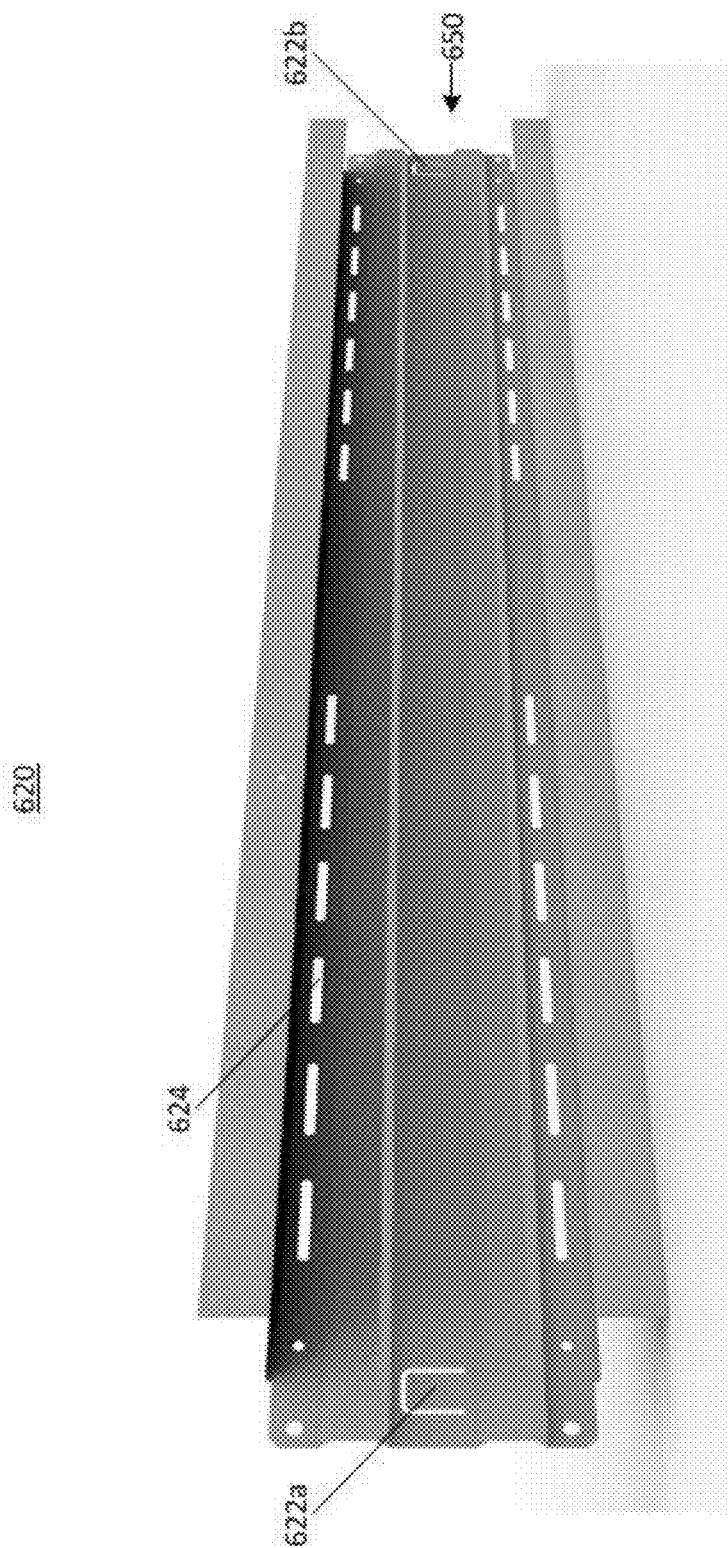

FIGS. 6A-6B are perspective views of a ballast tray 620 used in the array of solar panels shown in FIG. 1A, according to an illustrative implementation. The ballast tray 620 corresponds to the ballast trays 120 shown in FIG. 1A. The ballast tray 620 includes a channel 650 and two security tabs 622a and 622b (generally referred to as security tabs 622). The ballast tray 620 also includes slots such as the slot 624 along its length. In some implementations, the ballast tray 620 may also include one or more threaded fasteners 690.

In some implementations, the ballast tray 620 is formed from metal. For example, steel or aluminum may be used to form the ballast tray 620. In other implementations, a metal alloy may be used. Metal may be a suitable material due to its ability to provide structural integrity to the frame. Metal also can provide for an electrical path to earth ground through the ballast tray 620. Furthermore, due to its low cost and malleability, forming the ballast tray 620 from a metal can reduce the overall production cost and complexity of the ballast tray 620. For example, the ballast tray 620 can be formed from a flat sheet of metal. The sheet can be cut to the correct dimensions and can then be bent into the proper shape. Therefore, in some implementations, the ballast tray 620 can be formed from a single piece of material.

The ballast tray 620 can be mounted to structural members such as the front support members 230 shown in FIGS. 2A-2B or the middle support members 360 shown in FIGS. 3A-3B. For example, the ballast tray 620 can be positioned such that the slots 624 are aligned with mounting holes on the desired support structure. Bolts or other mechanical fasteners can be place through the slots 624 and mounting holes to secure the ballast tray 620 to the support structure. Because there are many slots 624 along the length of the ballast tray 620, particular knowledge of the position of the mounting holes on the support structures is not required at the time of manufacturing. Rather, it can be assumed that the large number of slots 624 will provide adequate ability to reposition the ballast tray 620 such that it can be fastened to the desired support structures at the installation site. Thus, the slots 624 simplify the manufacturing and installation process for the ballast tray 620.

The security tabs 622 help to ensure that the ballast blocks will not easily slide out or be removed from the ballast tray ballast tray 620 when the ballast tray 620 is in use. For example, as shown in FIG. 6B, the security tab 622a can be bent at an angle of approximately 90 degrees so that it protrudes in the channel 650. The security tab 622b can also be bent into a similar position, however it is shown in its original position in FIG. 6B for illustrative purposes. In some implementations, after the ballast blocks have been installed in the channel 650 at the installation site, a technician can pull the security tabs 622 downward. The protruding security tabs 622 can then prevent the ballast blocks from sliding along the length of the channel 650 and falling out the sides of the ballast tray 620. As discussed above, the sidewalls of the channel 650 can also serve as clamps to put pressure on the ballast blocks, thereby securing them in place within the channel 650.

The threaded fasteners 690 may be included on the ballast tray 620 to facilitate connecting adjacent ballast trays to one another for added structural integrity. In some implementations, the threaded fastener 690 may be a Rivnut manufactured by Cardinal Components, Inc., or a PEM fastener manufactured by Penn Engineering and Manufacturing Corp. As shown in FIG. 1A, each row of the array may include several ballast trays joined together. In some implementations, some of the ballast trays may include threaded fasteners 690 so that adjacent ballast trays may be connected. In some implementations, longer ballast trays 620 do not include threaded fasteners 690, while shorter ballast trays 620 do include threaded fasteners 690. In some implementations, the threaded fasteners 690 may be preinstalled before the ballast trays 620 are delivered to the installation site. Therefore, technicians can work more quickly to install the ballast trays 620 in the array 100 at the installation site, as the threaded fasteners can be preinstalled.

Figure 7A:
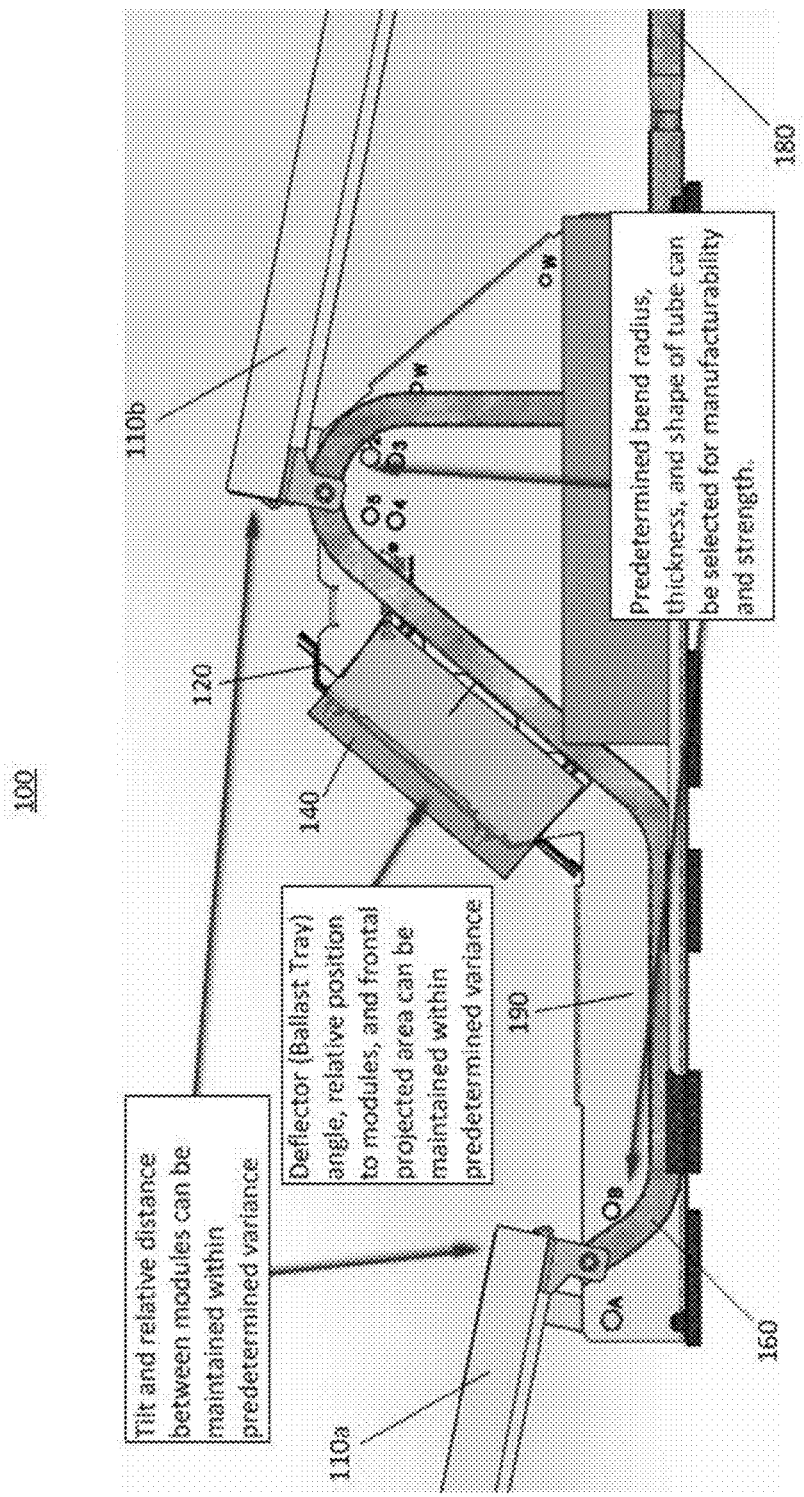
FIGS. 7A-7B are side views of an array of solar panels, according to an illustrative implementation.
Figure 7B:
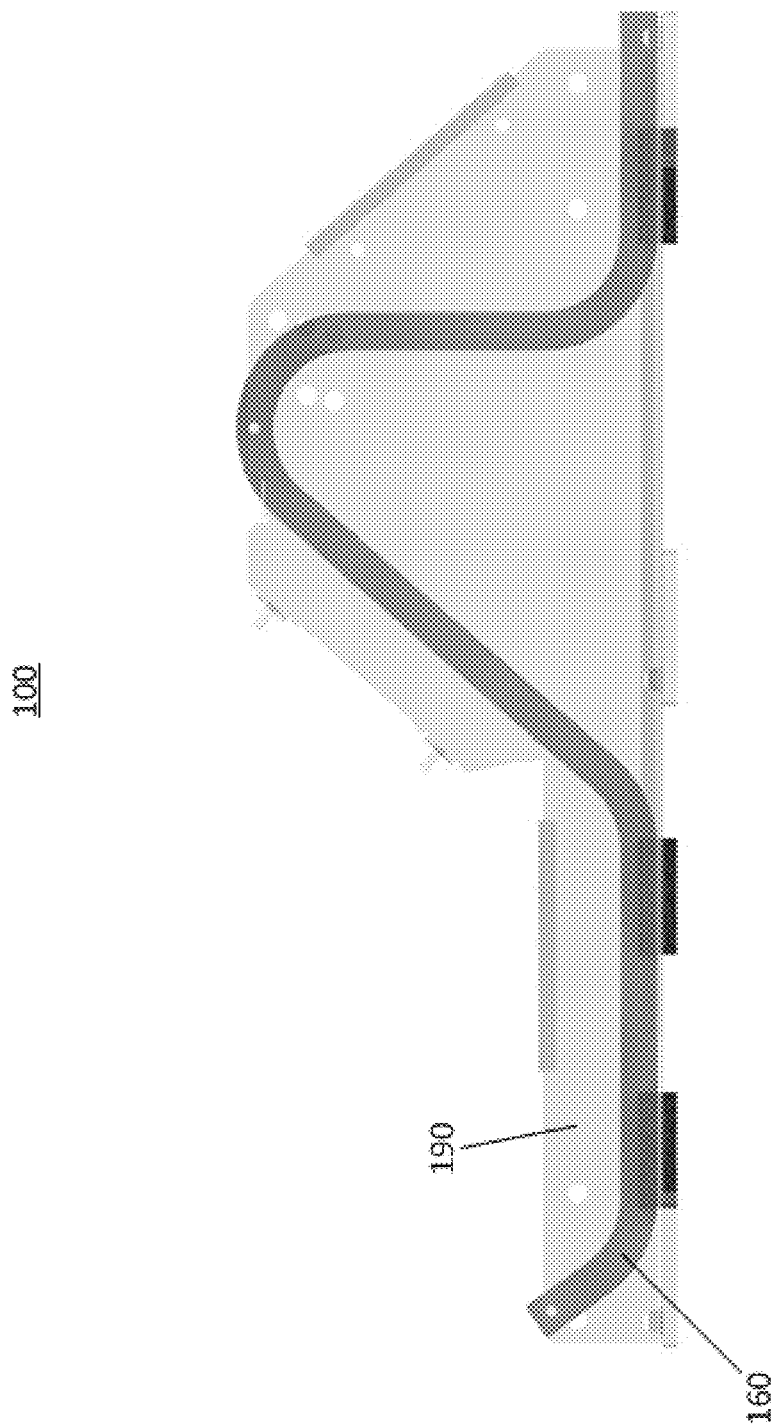

FIGS. 7A-7B are side views of an array 100 of solar panels 110, according to an illustrative implementation. The array 100 is similar to the array 100 shown in FIGS. 1A-1C. For example, the array 100 includes a plurality of solar panels 110, two of which (e.g., solar panels 110a and 110b) are shown in FIG. 7A. Middle support members such as the middle support member 160 support the solar panels 100 above a supporting surface. A ballast tray 120 rests on the middle support member 160 and supports a ballast block 140. An alternative support member 190 is also shown overlaid on the middle support member 160. The alternative support member 190 is shown only for comparison and illustrative purposes and is not part of the system or required to support the solar panels 110, the ballast tray 120, and the ballast block 140. The system including the middle support member 160 can be used to realize several advantages relative to systems that include support members similar to the alternative support members 190. Several of these advantages are addressed below.

The cross-sectional views of FIGS. 7A and 7B show that the alternative support member 190 is a solid piece of material from the level of the supporting surface to the upper edge of the alternative support member 190. The alternative support member 190 therefore in some implementations requires a significant amount of material to manufacture, which can result in increased cost as well as increased weight. In some implementations, the alternative support member 190 is formed from metal and can weigh in the range of about 15 pounds to about 25 pounds. In contrast, the middle support member 160 can be formed from a tubular metal structure which requires significantly less material to manufacture. In some implementations, the middle support member 160 can be formed from a steel tube having a thickness of about 0.035 inches. The tube may have a diameter in the range of about 0.5 inches to about 1.5 inches and may have a square cross-sectional shape. In some implementations, the tube may have a diameter of about 1 inch. Other cross-sectional shapes may also be used for the tubular structure used to form the middle support member 160.

For ease of manufacturing, the middle support member 160 may be formed from a straight tubular structure that is bent into a predetermined shape or profile, such as a profile providing, establishing or maintaining a predetermined set of one or more characteristics, such as the tilt angle of the solar panels 110, the horizontal and vertical distances between the solar panels 110 and the ballast trays 120, the tilt angle of the ballast trays 120, the bend radius of middle supports 160, and the strength of the overall array 100. These predetermined characteristics are described further below.

In some implementations, the middle support 160 can be bent into a predetermined shape selected to support the solar panels 110 at a predetermined angle. For example, the angle at which the solar panels 110 are supported may be selected to substantially face the sun during daylight hours. In implementations in which the array 100 is mounted on a roof or other horizontal surface, a relatively small tilt angle may be desired to ensure that the solar panels 110 are oriented towards the sun in order to capture a large amount of solar energy. For example, the middle support 160 may be configured to maintain a tilt angle of 5 degrees or 10 degrees for the solar panels 110. In some implementations, the orientation of the array 100 may also be adjusted to further cause the surfaces of the solar panels 110 to face the sun. For example, for installations in the northern hemisphere, the middle supports 160 may be configured to support the solar panels at a predetermined angle towards the south.

In some implementations, the middle support members 160 can be bent into a predetermined shape selected to maintain predetermined vertical and horizontal distances between the solar panels 110 and the ballast trays 120. For example, the vertical distance between the upper edge of a ballast tray 120 and the upper edge of a solar panel 110 can serve as a ventilation gap. In some implementations, this predetermined vertical distance between the upper edge of each ballast tray 120 and the upper edge of each solar panel 110 can be in the range of about 2 inches to about 5 inches. The predetermined horizontal distance between the lower edge of the solar panels 110 and the lower edge of the ballast trays 120 can provide space for a technician to access the components of the array 100 during installation or repair operations. To allow a technician to walk safely between the rows of solar panels 110 in the array 100, the middle support structure 160 may be bent into a desired shape selected to provide adequate walking space between the rows of solar panels 110 in the array 100. For example, in some implementations, the middle support structure 160 may be bent into a shape such that the ballast trays 120 are positioned away from the solar panels 110 by a distance of about 6 inches or more.

In some implementations, the middle support member 160 can be bent into a predetermined profile selected to support the ballast trays 120 at a predetermined angle. The angle at which the ballast trays are supported can impact the aerodynamics of the array 100 as well the walk space between the ballast trays and the solar panels. In some implementations, the middle support members 160 may be formed into a shape selected to support the ballast trays at an angle in the range of about 40 degrees to about 50 degrees, which can provide sufficient walk distance between the ballast trays and the lower edge of the solar panels while also providing adequate wind deflection capability. In some other implementations, the middle support members 160 may be configured to support the ballast trays 120 at other suitable angles.

In some implementations, the middle support structure 160 may be formed into a profile by bending the tubular structure forming the middle support structure 160 at a predetermined bend radius. The bend radius may be selected for structural strength as well as ease of manufacturing. For example, in some implementations, bending the middle support member 160 at a radius of curvature of in the range of about 1.5 inches to about 2.5 inches can result in sufficient structural strength to support the solar panels 110, ballast trays 120, and ballast blocks 140. In some implementations, the bend radius can be about 2 inches. In some implementations, the middle support members may also be configured to support a predetermined load weight, which may come from the weight of the solar panels 110 and ballast trays 120 populated with up to five ballast blocks as well as other forces resulting from environmental conditions in the area where the array 100 is installed. For example, in some implementations, the middle support member 160 may be configured to support about 60 pounds per square inch of snow. In some other implementations, the middle support member 160 may be configured to support about 90 pounds per square inch of snow. The middle support member 160 also can be configured to withstand winds up to about 150 miles per hour.

The middle support member 160 can maintain a predetermined profile substantially the same as the profile of the alternative support member 190. However, the middle support member 160 can be formed from significantly less material than the alternative support member 190. For example, the middle support member 160 is formed with structural material mainly positioned at the perimeter of the profile of the middle support member 160, where the other components of the array 100 connect to the middle support member 160. Because the interior region of the profile shape of the middle support member 160 are not used to connect other components of the array 100, it is unnecessary to have structural material in the interior region. In contrast, the alternative support member 190 is formed from structural material defining the profile and filling the interior region as well. Therefore, the alternative support member 190 requires significantly more material to define the same profile as the middle support member 160. Thus, in some implementations, the middle support member 160 can be formed using about one third of the structural material needed to form the alternative support member 190. However, because the middle support member 160 can be formed from a hollow tubular structure having high structural strength, the strength of the middle support member 160 can provide as much structural support as the alternative support member 190. Furthermore, using a tubular structure to form the middle support member 160 facilitates ease of manufacturing. For example, the tubular structure is an inexpensive component that is commercially available, and it can simply be bent into a predetermined shape to form the middle support member 160. No additional tools or manufacturing equipment are necessary, which further reduces the cost of the middle support structure 160 relative to the alternative support structure 190.

What is claimed is:

1. A deflector element for a solar panel module mounting system, the deflector element comprising:
    a tray;
    a first side wall coupled to a first edge of the tray and extending away from an upper surface of the tray; and
    a second side wall coupled to a second edge of the tray opposing the first edge of the tray, the second side wall extending away from the upper surface of the tray, such that the tray, the first sidewall, and the second sidewall together define a channel for receiving a ballast weight, wherein:
        the first sidewall and the second sidewall are arranged at angles of less than 90 degrees with respect to the upper surface of the tray such that the first sidewall and the second sidewall exert a clamping force on the ballast weight when the ballast weight is positioned on the upper surface of the tray within the channel, wherein the tray further comprises:
a first security tab positioned at a first end of the tray and a second security tab positioned at a second end of the tray, the first security tab and the second security tab configured to be moved into positions protruding into the channel to prevent the ballast weight from sliding laterally within the channel.

2. The deflector element of claim 1, wherein the ballast weight comprises one or more concrete blocks.

3. The deflector element of claim 1, wherein the tray further comprises at least one threaded fastener configured to secure the deflector element to an adjacent deflector element.

4. The deflector element of claim 1, wherein the tray further comprises a plurality of slots along the length of the tray, the plurality of slots configured to be aligned with at least one mounting hole of a solar panel module support structure to which the deflector element is secured.

5. A system for mounting one or more solar panel modules above a supporting surface, the system comprising:
at least one tubular component including:
a first curved portion configured to rise to a first height above and extending along a length of the tubular component, the first curved portion having a predetermined diameter, a predetermined thickness, and a predetermined bend radius selected to support a first solar panel module attached by a first end at a first attachment point positioned at the first height, wherein the first curved portion includes an elongated leg configured to support a deflector element projecting outwardly at a predetermined angle to the mounting surface;
a distal end having a second curved portion configured to rise to a second height above and extending along the length of the tubular component and having a second attachment point at the second height, the second attachment point separated from the first attachment point by a predetermined distance and configured to support a second end of a second solar panel module at a predetermined tilt, wherein the deflector element comprises:
a tray;
a first side wall coupled to a first edge of the tray and extending away from an upper surface of the tray; and
a second side wall coupled to a second edge of the tray opposing the first edge of the tray, the second side wall extending away from the upper surface of the tray, such that the tray, the first sidewall, and the second sidewall together define a channel for receiving a ballast weight, wherein:
the first sidewall and the second sidewall are arranged at angles of less than 90 degrees with respect to the upper surface of the tray such that the first sidewall and the second sidewall exert a clamping force on the ballast weight when the ballast weight is positioned on the upper surface of the tray within the channel, wherein the tray further comprises:
a first tab positioned at a first end of the tray and a second tab positioned at a second end of the tray, the first tab and the second tab configured to be moved into positions protruding into the channel to prevent the ballast weight from sliding laterally within the channel.

6. The system of claim 5, further comprising a foot element positioned between a bottom surface of the at least one tubular component and the mounting surface to prevent damage to the mounting surface.

7. The system of claim 5, wherein the system is configured to withstand winds of up to 150 miles per hour.

8. The system of claim 5, wherein the predetermined tilt of the second solar panel module is opposed to the predetermined angle of the deflector element.

9. The system of claim 5, wherein the at least one tubular component is formed from an electrically conductive material configured to provide an electrical path from the one or more solar panel modules to earth ground.

10. The system of claim 5, wherein the predetermined bend radius is in a range of 1.5 inches to 2.5 inches.

11. The system of claim 5, wherein the predetermined angle of the deflector element is in a range of 40 degrees to 50 degrees.

* * * * *